United States Patent
Wu et al.

(10) Patent No.: US 11,206,098 B2
(45) Date of Patent: Dec. 21, 2021

(54) METHOD AND DEVICE IN UE AND BASE STATION USD FOR WIRELESS COMMUNICATION

(71) Applicant: Shanghai Langbo Communication Technology Company Limited, Shanghai (CN)

(72) Inventors: Ke-Ying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 277 days.

(21) Appl. No.: 16/162,423

(22) Filed: Oct. 17, 2018

(65) Prior Publication Data
US 2019/0115996 A1   Apr. 18, 2019

(30) Foreign Application Priority Data
Oct. 17, 2017  (CN) .......................... 201710965731.3

(51) Int. Cl.
| H04B 7/0456 | (2017.01) |
| H04B 7/06 | (2006.01) |
| H04L 1/00 | (2006.01) |
| H04L 1/18 | (2006.01) |
| H04L 5/00 | (2006.01) |

(52) U.S. Cl.
CPC ......... *H04L 1/0003* (2013.01); *H04B 7/0626* (2013.01); *H04L 1/0025* (2013.01);
(Continued)

(58) Field of Classification Search
CPC .. H04B 7/0413; H04B 7/0626; H04B 7/0632; H04B 7/0456; H04B 7/0617;
(Continued)

(56) References Cited

U.S. PATENT DOCUMENTS

| 2014/0071934 A1* | 3/2014 | Frenne | H04L 5/0053 |
| | | | 370/330 |
| 2014/0301310 A1* | 10/2014 | Kuo | H04L 5/0048 |
| | | | 370/329 |
| 2016/0112099 A1* | 4/2016 | Lee | H04B 7/0413 |
| | | | 370/252 |

FOREIGN PATENT DOCUMENTS

| CN | 102484515 A | 5/2012 |
| CN | 103795513 A | 5/2014 |

(Continued)

OTHER PUBLICATIONS

CN 1st Office Action received in application No. 201710965731.3 dated Mar. 13, 2020.
(Continued)

*Primary Examiner* — Melvin C Marcelo
*Assistant Examiner* — Natali Pascual Peguero
(74) *Attorney, Agent, or Firm* — Maschoff Brennan

(57) ABSTRACT

A method and a device in a User Equipment (UE) and a base station for wireless communication are disclosed. The UE transmits a first radio signal including M first-type radio signals transmitted by M antenna port groups and a second-type radio signal transmitted by a target antenna port group; the second-type radio signal carries uplink control information; and at least one of the following is used for determining the target antenna port group from the M antenna port groups: a first antenna port group, wherein a reception for a radio signal transmitted by the first antenna port group is used for generating the uplink control information; M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group.

20 Claims, 15 Drawing Sheets

(52) U.S. Cl.
CPC .......... *H04L 1/0028* (2013.01); *H04L 1/0061* (2013.01); *H04L 1/1812* (2013.01); *H04L 1/1861* (2013.01); *H04L 5/0048* (2013.01); *H04B 7/0456* (2013.01); *H04B 7/0617* (2013.01)

(58) Field of Classification Search
CPC ... H04L 1/0003; H04L 1/0025; H04L 1/0028; H04L 1/0061; H04L 1/1812; H04L 1/1861; H04L 5/0048; H04L 5/0053; H04W 72/042; H04W 72/0446
See application file for complete search history.

(56) References Cited

FOREIGN PATENT DOCUMENTS

| | | | |
|---|---|---|---|
| CN | 106209195 | A | 12/2016 |
| CN | 106465097 | A | 2/2017 |
| WO | 2016182038 | A1 | 11/2016 |

OTHER PUBLICATIONS

CN 2nd Office Action received in application No. 201710965731.3 dated Jun. 3, 2020.

CN 1st Search report received in application No. 201710965731.3 dated Mar. 10, 2020.

«3GPP Draft:R1-1709935» Huawei, HiSilicon Details of QCL Assumptions and related RS design considerations 20170616.

«3GPP Draft:R1-1716001» Samsung BSI Reporting on PUCCH 20170910.

«3GPP Draft:R1-167199» Huawei,HiSilicon Evaluation of the impact of QCL Assumptions and Discussion on Potential QCL Configurations 20160812.

CN 2nd Search report received in application No. 201710965731.3 dated May 23, 2020.

\* cited by examiner

METHOD AND DEVICE IN UE AND BASE STATION USD FOR WIRELESS COMMUNICATION

CROSS REFERENCE TO RELATED APPLICATION

This application claims the priority benefit of Chinese Patent Application Serial Number 201710965731.3, filed on Oct. 17, 2017, the full disclosure of which is incorporated herein by reference.

BACKGROUND

Technical Field

The present disclosure relates to transmission methods and devices of radio signals in wireless communication systems, and in particular to a transmission method and device for radio signals in a wireless communication system supporting multi-antenna transmission.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication. Generally, the beam formed by multiple antennas through beamforming is relatively narrow; thus, the beam of a base station and the beam of a UE need to be aligned to perform effective communication. When the beams of the base station and the UE are out of alignment due to blocking or the movement of the UE, etc., that is, the beams are not aligned, the communication between the base station and the UE will be significantly degraded, even unavailable.

In order to guarantee the robustness of communication, multiple Transmitter Receiver Points (TRPs) may serve one UE simultaneously. A UE employs different beams to align to beams from different TRPs, to form multiple beam pairs. When one beam pair fails, other beam pairs probably are still in alignment. Therefore, it is guaranteed that the communication quality for the UE is maintained above certain level.

SUMMARY

The inventor finds through researches that, in the condition that multiple TRPs serve one UE simultaneously, uplink control information for multiple TRPs, for example, Hybrid Automatic Repeat reQuest Acknowledgement (HARQ-ACK) and Channel State Information (CSI), needs to be transmitted by correct beamforming vectors to ensure that corresponding TRPs can receive the uplink control information correctly. When a user transmits uplink data for multiple TRPs using different beamforming vectors, and meanwhile carries uplink control information in an uplink physical layer data channel, how to select an appropriate beamforming vector to transmit the uplink control information to ensure that the uplink control information is received by a correct TRP is a problem needing to be solved.

In view of the above problems, the present disclosure provides a solution. The embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for wireless communication, wherein the method includes:
transmitting a first radio signal.

Herein, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used for determining the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group from the M antenna port groups.

Herein, one antenna port group includes a positive integer number of antenna ports, and the M is a positive integer greater than 1.

In one embodiment, the above method has the following benefits: when the M first-type radio signals are specific to different target receivers respectively, the transmitting antenna port group for the second-type radio signal may be selected flexibly and dynamically from the M antenna port groups; and the reception quality of the second-type radio signal by a target receiver of the second-type radio signal is improved.

In one embodiment, the uplink control information carried by the second-type radio signal is UCI (Uplink Control Information).

In one embodiment, the uplink control information carried by the second-type radio signal includes at least one of {HARQ-ACK, CSI, Rank Indicator (RI), Channel Quality Indicator (CQI), Precoding Matrix Indicator (PMI), Channel-state information reference signals Resource Indicator (CRI)}.

In one embodiment, the M is equal to 2.

In one embodiment, the M is greater than 2.

In one embodiment, a radio signal transmitted by the first antenna port group is data, and the uplink control information carried by the second-type radio signal is used for determining whether the data is correctly received.

In one subembodiment, the uplink control information carried by the second-type radio signal includes HARQ-ACK.

In one embodiment, a radio signal transmitted by the first antenna port group is a downlink reference signal, and a measurement targeting the downlink reference signal is used for generating the uplink control information carried by the second-type radio signal.

In one subembodiment, the downlink reference signal includes one or more of {Synchronization Signal (SS), Master Information Block (MIB)/System Information Block (SIB), Channel State Information Reference Signal (CSI-RS)}.

In one subembodiment, the uplink control information carried by the second-type radio signal includes at least one of {CSI, RI, CQI, PMI, CRI}.

In one embodiment, one antenna port is formed by superposition of multiple antennas through antenna virtualization, and mapping coefficients from the multiple antennas to the antenna port constitute a beamforming vector corresponding to the antenna port.

In one subembodiment, one beamforming vector is formed by the product of one analog beamforming matrix and one digital beamforming vector.

In one embodiment, the M downlink signalings are dynamic signalings for uplink grant, respectively.

In one embodiment, the M downlink signalings include Downlink Control Information (DCI) respectively.

In one embodiment, the M time-frequency resources include a positive integer number of Resource Elements (REs) respectively.

In one embodiment, one RE occupies a duration of one multicarrier symbol in time domain, and occupies a bandwidth of one subcarrier in frequency domain.

In one subembodiment, the multicarrier symbol is an Orthogonal Frequency Division Multiplexing (OFDM) symbol.

In one subembodiment, the multicarrier symbol is a Discrete Fourier Transform Spread OFDM (DFT-S-OFDM) symbol.

In one subembodiment, the multicarrier symbol is a Filter Bank Multi Carrier (FBMC) symbol.

In one embodiment, the M time-frequency resources are M COntrol REsource SETs (CORESETs) respectively.

In one embodiment, the M time-frequency resources are M search spaces respectively.

In one embodiment, the phrase that the M downlink signalings are searched for in the M time-frequency resources respectively t refers that: the UE monitors the M downlink signalings in the M time-frequency resources respectively.

In one subembodiment, the UE monitors the M downlink signalings in the M time-frequency resource respectively via blind decoding, that is, receiving a signal in any one of the M time-frequency resources and performing decoding; if the decoding is determined to be correct according to parity check bits, it is judged that the reception is successful; otherwise, it is judged that the reception is failed.

In one embodiment, the first information is carried by a higher layer signaling.

In one embodiment, the first information is carried by a Radio Resource Control (RRC) signaling.

In one embodiment, the first information is carried by a physical layer signaling.

In one embodiment, the first information is carried by both a higher layer signaling and a physical layer signaling.

In one embodiment, the M first-type radio signals are transmitted on one same uplink physical layer data channel (that is, an uplink channel capable of carrying physical layer data).

In one subembodiment, the first radio signal is transmitted on the uplink physical layer data channel.

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, the M first-type radio signals are transmitted on M uplink physical layer data channels (that is, uplink channels capable of carrying physical layer data) respectively.

In one subembodiment, the second-type radio signal is transmitted on one of the M uplink physical layer data channels.

In one subembodiment, the M uplink physical layer data channels are PUSCHs respectively.

In one subembodiment, the M uplink physical layer data channels are sPUSCHs respectively.

In one subembodiment, the M uplink physical layer data channels are NR-PUSCHs respectively.

In one subembodiment, the M uplink physical layer data channels are NB-PUSCHs respectively.

In one embodiment, the second-type radio signal and a target radio signal are transmitted on one same uplink physical layer data channel (that is, an uplink channel capable of carrying physical layer data), and the target radio signal is one of the M first-type radio signals that is transmitted by the target antenna port group.

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the M downlink signalings are transmitted on M downlink physical layer control channels (that is, downlink channels capable of carrying physical layer signalings only) respectively.

In one subembodiment, the M downlink physical layer control channels are PDCCHs respectively.

In one subembodiment, the M downlink physical layer control channels are sPDCCHs respectively.

In one subembodiment, the M downlink physical layer control channels are NR-PDCCHs respectively.

In one subembodiment, the M downlink physical layer control channels are NB-PDCCHs respectively.

According to one aspect of the present disclosure, the method includes:

receiving first information.

Herein, the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 Modulation and Coding Scheme (MCS) indexes respectively, and a MCS index corresponding to one of the M first-type radio signals is equal to a maximum value in the M1 MCS indexes.

In one embodiment, the above method has the following benefits: when the M first-type radio signals are directed to one same target receiver, an antenna port group corresponding to a first-type radio signal having the maximum MCS index is used for transmitting the second-type radio signal; when the M first-type radio signals are specific to different target receivers, an antenna port group corresponding to a target receiver of the second-type radio signal is used for transmitting the second-type radio signal. In both cases, the reception quality of the second-type radio signal by the target receiver of the second-type radio signal can be optimized.

In one embodiment, the M antenna port groups are a subset of the M1 antenna port groups.

In one embodiment, the M first-type radio signals are a subset of the M1 first-type radio signals.

In one embodiment, the M1 first-type radio signals carry data respectively.

In one embodiment, any one of the M1 first-type radio signals that does not belong to the M first-type radio signals carry at least the former one of {data, uplink control information}.

In one embodiment, the M1 antenna port groups all belong to a first port group set, and the first port group set includes a positive integer number of antenna port groups. An index of an antenna port group corresponding to another of the M first-type radio signals in the first port group set is equal to a minimum value of indexes of the M1 antenna port groups in the first port group set.

In one embodiment, the M1 antenna port groups all belong to a first port group set, and the first port group set includes a positive integer number of antenna port groups. An index of an antenna port group corresponding to the one of the M first-type radio signals in the first port group set is equal to a minimum value of indexes of the M1 antenna port groups in the first port group set, and an index of an antenna port group corresponding to another of the M first-type radio signals in the first port group set is equal to a second minimum value of indexes of the M1 antenna port groups in the first port group set.

In one embodiment, any of the M1 MCS indexes is $I_{MCS}$, and refer to Technical Specification (TS) 36.213 for a specific definition of the $I_{MCS}$.

In one embodiment, any one of the M1 MCS indexes is a non-negative integer.

In one embodiment, an index of an antenna port group corresponding to another of the M first-type radio signals in the M1 antenna port groups is default (no configuration is needed).

In one embodiment, an index of an antenna port group corresponding to another of the M first-type radio signals in the M1 antenna port groups is preconfigured.

In one embodiment, an index of an antenna port group corresponding to the one of the M first-type radio signals in the M1 antenna port groups is greater than 0, and an index of an antenna port group corresponding to another of the M first-type radio signals in the M1 antenna port groups is equal to 0.

In one embodiment, an index of an antenna port group corresponding to the one of the M first-type radio signals in the M1 antenna port groups is equal to 0, and an index of an antenna port group corresponding to another of the M first-type radio signals in the M1 antenna port groups is equal to 1.

In one embodiment, the first information includes one bit; when the one bit included in the first information is equal to 0, the target antenna port group is an antenna port group corresponding to the one of the M first-type radio signals; when the one bit included in the first information is equal to 1, the target antenna port group is an antenna port group corresponding to another of the M first-type radio signals.

In one embodiment, the first information includes one bit; when the one bit included in the first information is equal to 1, the target antenna port group is an antenna port group corresponding to the one of the M first-type radio signals; when the one bit included in the first information is equal to 0, the target antenna port group is an antenna port group corresponding to another of the M first-type radio signals.

In one embodiment, the M1 is equal to the M.

In one embodiment, the M1 is greater than the M.

In one embodiment, the M1 is equal to 2.

In one embodiment, the M1 is greater than 2.

In one embodiment, any two of the M1 antenna port groups include different numbers of antenna ports.

In one embodiment, at least two of the M1 antenna port groups include different numbers of antenna ports.

In one embodiment, any two of the M1 antenna port groups include a same number of antenna ports.

In one embodiment, at least two of the M1 antenna port groups include a same number of antenna ports.

According to one aspect of the present disclosure, the method includes:

receiving a first signaling.

Herein, the first signaling includes scheduling information of the first radio signal.

In one embodiment, the first signaling is a dynamic signaling.

In one embodiment, the first signaling is a dynamic signaling for uplink grant.

In one embodiment, the first signaling includes a DCI.

In one embodiment, the first signaling includes an uplink grant DCI.

In one embodiment, the scheduling information of the first radio signal includes at least one of {MCS, configuration information of Demodulation Reference Signals (DMRS), HARQ process number, Redundancy Version (RV), New Data Indicator (NDI)}.

In one subembodiment, the configuration information of DMRS includes one or more of {occupied time-domain resources, occupied frequency-domain resources, occupied code domain resources, cyclic shift, Orthogonal Cover Code (OCC)}.

In one embodiment, the first signaling is used for determining the M1 antenna port groups.

In one embodiment, the first signaling is used for determining the M antenna port groups.

In one embodiment, the M1 antenna port groups all belong to a first port group set, and the first port group set includes a positive integer number of antenna port groups. The first signaling indicates an index of each of the M1 antenna port groups in the first port group set.

In one embodiment, the first signaling indicates M2 MCS indexes, the M2 MCS indexes are a subset of the M1 MCS indexes, and the M2 is a non-negative integer not greater than the M1.

In one subembodiment, the M2 is equal to the M1.

In one subembodiment, the M2 is less than the M1.

In one subembodiment, the M2 is equal to 0.

In one subembodiment, the M2 is greater than 0.

In one embodiment, M2 first fields in the first signaling are used for determining M2 MCS indexes, the M2 MCS indexes are a subset of the M1 MCS indexes, and the M2 is a non-negative integer not greater than the M1.

In one subembodiment, any one of the M2 first fields indicates $I_{MCS}$; the $I_{MCS}$ is an MCS index, and refer to TS36.213 for a specific definition of the $I_{MCS}$.

In one embodiment, the first signaling is used for determining the first information.

In one embodiment, the first signaling indicates explicitly the first information.

In one subembodiment, the first signaling includes a second field, and the second field in the first signaling indicates the first information.

In one embodiment, the first signaling indicates implicitly the first information.

In one embodiment, a format of the first signaling is used for determining the first information.

In one embodiment, the first information is a format of the first signaling.

In one embodiment, if a format of the first signaling belongs to a first format set, the target antenna port group is an antenna port group corresponding to the one of the M first-type radio signals; if the format of the first signaling belongs to a second format set, the target antenna port group is an antenna port group corresponding to another of the M first-type radio signals. The first format set and the second format set include a positive integer number of formats respectively.

In one embodiment, a payload size of the first signaling is used for determining the first information.

In one embodiment, the first information is a payload size of the first signaling.

In one embodiment, if a payload size of the first signaling belongs to a first size set, the target antenna port group is an antenna port group corresponding to the one of the M first-type radio signals; if the payload size of the first signaling belongs to a second size set, the target antenna port group is an antenna port group corresponding to another of the M first-type radio signals. The first size set and the second size set include a positive integer number of payload sizes respectively.

In one embodiment, the first information is determined by both a higher layer signaling and the first signaling.

In one embodiment, the first signaling indicates the M1 antenna port groups.

In one embodiment, the M1 antenna port groups are used for determining the first information.

In one embodiment, if all antenna ports in the M1 antenna port groups belong to one of {a first port group set, a second port group set} only, the target antenna port group is an antenna port group corresponding to the one of the M first-type radio signals; if a part of the antenna ports in the M1 antenna port groups belong to the first port group set, and another part of the antenna ports in the M1 antenna port groups belong to the second port group set, the target antenna port group is an antenna port group corresponding to another of the M first-type radio signals. The first port group set and the second port group set include a positive integer number of antenna port groups respectively.

In one subembodiment, any antenna port in the first port group set and any antenna port in the second port group set are not Quasi Co-Located (QCLed).

In one subembodiment, a transmitter of a radio signal transmitted from an antenna port in the first port group set is a first node, a transmitter of a radio signal transmitted from an antenna port in the second port group set is a second node, the first node and the second node have different IDs.

In one reference embodiment of the above subembodiment, the IDs of the first node and the second node are Physical Cell Identifiers (PCIs) respectively.

In one embodiment, the first signaling is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

According to one aspect of the present disclosure, the method includes:

receiving the M downlink signalings on the M time-frequency resources respectively.

Herein, the M downlink signalings include scheduling information of the M first-type radio signals respectively.

In one embodiment, the method in the UE for wireless communication includes:

receiving M4 downlink signalings on M4 time-frequency resources respectively.

Herein, the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M.

In one embodiment, the scheduling information of any of the M first-type radio signals includes at least one of {MCS, configuration information of DMRS, HARQ process number, RV, NDI}.

In one subembodiment, the configuration information of DMRS includes one or more of {occupied time-domain resources, occupied frequency-domain resources, occupied code domain resources, cyclic shift, OCC}.

According to one aspect of the present disclosure, the above method is characterized in that: a target time-frequency resource belongs to a first time-frequency resource set, the target time-frequency resource is one of the M time-frequency resources that is corresponding to a target radio signal, and the target radio signal is one of the M first-type radio signals that is transmitted by the target antenna port group.

In one embodiment, the above method has the following benefits: the target time-frequency resource may be used to indicate implicitly the target antenna port group; and a related signaling overhead is reduced.

In one embodiment, the method in the UE for wireless communication includes:

receiving a first downlink signaling.

Herein, the first downlink signaling is used for determining the first time-frequency resource set.

In one subembodiment, the first downlink signaling is a higher layer signaling.

In one subembodiment, the first downlink signaling is an RRC signaling.

In one subembodiment, the first downlink signaling indicates the first time-frequency resource set.

In one embodiment, antenna ports in a reference antenna port set are used for transmitting radio signals on the first time-frequency resource set, and the reference antenna port set includes a positive integer number of antenna ports.

In one subembodiment, any antenna port in the reference antenna port set is QCLed with one antenna port in the first antenna port group.

In one subembodiment, any antenna port in the reference antenna port set is QCLed with any antenna port in the first antenna port group.

In one subembodiment, any two antenna ports in the reference antenna port set are QCLed.

In one embodiment, the first time-frequency resource set includes a positive integer number of REs.

In one embodiment, the first time-frequency resource set includes a positive integer number of CORESETs.

In one embodiment, the first time-frequency resource set includes a positive integer number of search spaces.

In one embodiment, antenna ports transmitting any two radio signals transmitted on the first time-frequency resource set are QCLed.

According to one aspect of the present disclosure, the above method is characterized in that: {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one embodiment, the above method has the following benefits: a relationship between the first antenna port group and the target antenna port group is used to indicate implicitly the target antenna port group; and a related signaling overhead is reduced.

In one embodiment, the first antenna port group pair is a Beam Pair Link (BPL).

In one embodiment, the first antenna port group pair consists of the second antenna port group and the third antenna port group.

In one embodiment, the method in the UE for wireless communication includes:
receiving a first reference signal.

Herein, the first reference signal is transmitted by the second antenna port group, and a measurement targeting the first reference signal is used for determining the third antenna port group.

In one subembodiment, the first reference signal includes one or more of {SS, MIB/SIB, CSI-RS}.

In one subembodiment, an analog beamforming matrix corresponding to the third antenna port group is a third beamforming matrix, and the third beamforming matrix is one of K1 beamforming matrixes. A reception quality obtained when the UE receives the first reference signal using the third beamforming matrix is greater than a reception quality obtained when the UE receives the first reference signal using any beamforming matrix in the K1 beamforming matrixes that is not equal to the third beamforming matrix. The K1 is a positive integer greater than 1.

In one reference embodiment of the above subembodiment, receiving a given radio signal using a given beamforming matrix refers that: the given beamforming matrix is used as an analog beamforming matrix, and a beamforming vector obtained when the given beamforming matrix is multiplied by a digital beamforming vector is used to receive the given radio signal.

In one reference embodiment of the above subembodiment, the reception quality is a Reference Signal Received Power (RSRP).

In one reference embodiment of the above subembodiment, the reception quality is a Reference Signal Received Quality (RSRQ).

In one reference embodiment of the above subembodiment, the reception quality is a CQI.

In one embodiment, the method in the UE for wireless communication includes:
transmitting a second reference signal.

Herein, the second reference signal is transmitted by the third antenna port group, and a measurement targeting the second reference signal is used for determining the second antenna port group.

In one subembodiment, the second reference signal includes one or more of {Random Access Channel (RACH) Preamble, Sounding Reference Signal (SRS)}.

In one subembodiment, an analog beamforming matrix corresponding to the second antenna port group is a second beamforming matrix, and the second beamforming matrix is one of K2 beamforming matrixes. A reception quality obtained when a target receiver of the first radio signal receives the second reference signal using the second beamforming matrix is greater than a reception quality obtained when the target receiver of the first radio signal receives the second reference signal using any beamforming matrix in the K2 beamforming matrixes that is not equal to the second beamforming matrix. The K2 is a positive integer greater than 1.

In one reference embodiment of the above subembodiment, receiving a given radio signal using a given beamforming matrix refers that: the given beamforming matrix is used as an analog beamforming matrix, and a beamforming vector obtained when the given beamforming matrix is multiplied by a digital beamforming vector is used to receive the given radio signal.

In one reference embodiment of the above subembodiment, the reception quality is an RSRP.

In one reference embodiment of the above subembodiment, the reception quality is an RSRQ.

In one reference embodiment of the above subembodiment, the reception quality is a CQI.

In one embodiment, the QCLed refers to Quasi Co-Located.

In one embodiment, two antenna port groups being QCLed refers that: any antenna port in one of the two antenna port groups is QCLed with at least one antenna port in another of the two antenna port groups.

In one embodiment, two antenna port groups being QCLed refers that: any antenna port in one of the two antenna port groups is QCLed with any antenna port in another of the two antenna port groups.

In one embodiment, two antenna ports are said to be QCLed if large-scale properties of a channel over which a symbol on one of the two antenna ports is conveyed can be inferred from a channel over which a symbol on another of the two antenna ports is conveyed. The large-scale properties include one or more of {delay spread, Doppler spread, Doppler shift, average gain, average delay, angle of arrival, angle of departure, spatial correlation}.

In one embodiment, two antenna ports being QCLed refers that: the two antenna ports correspond to a same analog beamforming matrix.

In one embodiment, two antenna ports being QCLed refers that: the two antenna ports correspond to a same beamforming matrix.

In one embodiment, two antenna ports being QCLed refers that: a target receiver for a radio signal transmitted from any of the two antenna ports may receive radio signals transmitted from the two antenna ports using a same beamforming vector.

In one embodiment, two antenna ports being QCLed refers that: a target receiver for a radio signal transmitted from any of the two antenna ports may receive radio signals transmitted from the two antenna ports using a same analog beamforming matrix.

In one embodiment, two antenna ports being QCLed refers that: a target receiver for a radio signal transmitted from any of the two antenna ports may receive radio signals transmitted from the two antenna ports using same spatial filtering.

According to one aspect of the present disclosure, the above method is characterized in that: {a number of REs occupied by a first radio sub-signal in time-frequency domain, a number of bits contained in a first bit block, a number of bits contained in a second bit block} are used for determining a number of REs occupied by the second-type radio signal in time-frequency domain; the first radio sub-signal includes a target radio signal and the second-type radio signal, the target radio signal is one of the M first-type radio signals that is transmitted by the target antenna port group, the target radio signal carries the first bit block, and the second-type radio signal carries the second bit block.

In one embodiment, the first bit block and the second bit block include a positive integer number of bits respectively.

In one embodiment, the first radio sub-signal is the first radio signal.

In one embodiment, the first radio sub-signal consists of the target radio signal and the second-type radio signal.

In one embodiment, a given radio signal carrying a given bit block refers that: the given radio signal is an output after the given bit block experiences in turn channel coding, modulation mapper, layer mapper, precoding, resource element mapper, and multicarrier symbol generation.

In one embodiment, a given radio signal carrying a given bit block refers that: the given radio signal is an output after the given bit block experiences in turn channel coding, modulation mapper, layer mapper, transform precoder (which is used for generating complex-value signals), precoding, resource element mapper, and multicarrier symbol generation.

In one embodiment, a given radio signal carrying a given bit block refers that: the given radio signal is an output after the given bit block experiences in turn Cyclic Redundancy Check attachment (CRC attachment), code block segmentation, code block CRC attachment, channel coding, modulation mapper, layer mapper, precoding, resource element mapper, and multicarrier symbol generation.

In one embodiment, a given radio signal carrying a given bit block refers that: the given radio signal is an output after the given bit block experiences in turn CRC attachment, code block segmentation, code block CRC attachment, channel coding, modulation mapper, layer mapper, transform precoder (which is used for generating complex-value signals), precoding, resource element mapper, and multicarrier symbol generation.

In one embodiment, a given radio signal carrying a given bit block refers that: the given bit block is used for generating the given radio signal.

In one embodiment, the RE refers to Resource Element.

In one embodiment, the RE occupies a duration of one multicarrier symbol in time domain, and occupies a bandwidth of one subcarrier in frequency domain.

In one subembodiment, the multicarrier symbol is an OFDM symbol.

In one subembodiment, the multicarrier symbol is a DFT-S-OFDM symbol.

In one subembodiment, the multicarrier symbol is an FBMC symbol.

According to one aspect of the present disclosure, the above method is characterized in that: {a number of REs occupied by a second radio signal in time-frequency domain, a number of bits contained in a first bit block, a number of bits contained in a second bit block} are used for determining a number of REs occupied by the second-type radio signal in time-frequency domain; both the second radio signal and a target radio signal carry the first bit block, the second-type radio signal carries the second bit block, and the target radio signal is one of the M first-type radio signals that is transmitted by the target antenna port group; and the second radio signal is a first transmission of the first bit block, and the target radio signal is a retransmission of the first bit block.

In one embodiment, the first bit block and the second bit block include a positive integer number of bits respectively.

In one embodiment, time domain resources occupied by the second radio signal are before time domain resources occupied by the first radio signal.

In one embodiment, the second radio signal includes at least the former one of {uplink data, uplink control information}.

In one embodiment, the second radio signal is transmitted on an uplink physical layer data channel (that is, an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, an RV corresponding to the second radio signal is different from an RV corresponding to the target radio signal.

In one embodiment, an NDI corresponding to the second radio signal is same as an NDI corresponding to the target radio signal.

In one embodiment, the second radio signal and the target radio signal correspond to a same HARQ process number.

According to one aspect of the present disclosure, the method further includes:

receiving a second signaling; and transmitting the second radio signal.

Herein, the second signaling includes scheduling information of the second radio signal.

In one embodiment, the first signaling indicates M2 MCS indexes, the second signaling indicates M3 MCS indexes, the M2 MCS indexes and the M3 MCS indexes are subsets of the M1 MCS indexes respectively, the M2 MCS indexes and the M3 MCS indexes constitute the M1 MCS indexes, the M2 is a non-negative integer not greater than the M1, and the M3 is equal to the M1 minus the M2.

In one subembodiment, there is no MCS index that belongs to both the M2 MCS indexes and the M3 MCS indexes.

In one subembodiment, the M3 MCS indexes include an MCS index in the M1 MCS indexes that is corresponding to the target radio signal.

In one subembodiment, the M3 MCS indexes include a maximum value in the M1 MCS indexes.

In one subembodiment, the M2 is equal to 0, and the M3 is equal to the M1.

In one subembodiment, the M2 is greater than 0, and the M3 is less than the M1.

In one subembodiment, the M3 is equal to 0, and the M2 is equal to the M1.

In one embodiment, M3 first fields in the first signaling are used for determining M3 MCS indexes, the M3 MCS indexes are a subset of the M1 MCS indexes, and the M3 is a non-negative integer not greater than the M1.

In one subembodiment, any of the M3 first fields indicates $I_{MCS}$; the $I_{MCS}$ is an MCS index, and refer to TS36.213 for a specific definition of the $I_{MCS}$.

In one embodiment, the second signaling indicates one of the M1 MCS indexes that is corresponding to the target radio signal.

In one embodiment, the second signaling indicates a maximum value in the M1 MCS indexes.

In one embodiment, the second signaling is a physical layer signaling.

In one embodiment, the second signaling is a dynamic signaling.

In one embodiment, the second signaling is a dynamic signaling for uplink grant.

In one embodiment, the second signaling is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the scheduling information of the second radio signal includes at least one of {MCS, configuration information of DMRS, HARQ process number, RV, NDI}.

The present disclosure provides a method in a base station for wireless communication, wherein the method includes:
receiving a first radio signal.

Herein, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used for determining the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group from the M antenna port groups.

Herein, one antenna port group includes a positive integer number of antenna ports, and the M is a positive integer greater than 1.

In one embodiment, the uplink control information carried by the second-type radio signal is UCI.

In one embodiment, a radio signal transmitted by the first antenna port group is data, and the uplink control information carried by the second-type radio signal is used for determining whether the data is correctly received.

In one embodiment, a radio signal transmitted by the first antenna port group is a downlink reference signal, and a measurement targeting the downlink reference signal is used for generating the uplink control information carried by the second-type radio signal.

According to one aspect of the present disclosure, the method includes:
transmitting first information.

Herein, the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 MCS indexes respectively, and a MCS index corresponding to one of the M first-type radio signals is equal to a maximum value in the M1 MCS indexes.

In one embodiment, any one of the M1 MCS indexes is $I_{MCS}$, and refer to TS 36.213 for a specific definition of the $I_{MCS}$.

In one embodiment, any one of the M1 MCS indexes is a non-negative integer.

According to one aspect of the present disclosure, the method includes:
transmitting a first signaling.

Herein, the first signaling includes scheduling information of the first radio signal.

In one embodiment, the first signaling is used for determining the M1 antenna port groups.

In one embodiment, the first signaling is used for determining the first information.

According to one aspect of the present disclosure, the method includes:
transmitting the M downlink signalings on the M time-frequency resources respectively.

Herein, the M downlink signalings include scheduling information of the M first-type radio signals respectively.

In one embodiment, the method in the base station for wireless communication includes:
transmitting M4 downlink signalings on M4 time-frequency resources respectively.

Herein, the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M.

According to one aspect of the present disclosure, the above method is characterized in that: a target time-frequency resource belongs to a first time-frequency resource set, the target time-frequency resource is one of the M time-frequency resources that is corresponding to a target radio signal, and the target radio signal is one of the M first-type radio signals that is transmitted by the target antenna port group.

In one embodiment, the method in the base station for wireless communication includes:
transmitting a first downlink signaling.

Herein, the first downlink signaling is used for determining the first time-frequency resource set.

In one subembodiment, the first downlink signaling is a higher layer signaling.

In one subembodiment, the first downlink signaling is an RRC signaling.

According to one aspect of the present disclosure, the above method is characterized in that: {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one embodiment, the method in the base station for wireless communication includes:
transmitting a first reference signal.

Herein, the first reference signal is transmitted by the second antenna port group, and a measurement targeting the first reference signal is used for determining the third antenna port group.

In one subembodiment, the first reference signal includes one or more of {SS, MIB/SIB, CSI-RS}.

In one embodiment, the method in the base station for wireless communication includes:

receiving a second reference signal.

Herein, the second reference signal is transmitted by the third antenna port group, and a measurement targeting the second reference signal is used for determining the second antenna port group.

In one subembodiment, the second reference signal includes one or more of {RACH Preamble, SRS}.

In one embodiment, the QCLed refers to Quasi Co-Located.

In one embodiment, two antenna port groups being QCLed refers that: any antenna port in one of the two antenna port groups is QCLed with at least one antenna port in another of the two antenna port groups.

In one embodiment, two antenna port groups being QCLed refers that: any antenna port in one of the two antenna port groups is QCLed with any antenna port in another of the two antenna port groups.

According to one aspect of the present disclosure, the above method is characterized in that: {a number of REs occupied by a first radio sub-signal in time-frequency domain, a number of bits contained in a first bit block, a number of bits contained in a second bit block} are used for determining a number of REs occupied by the second-type radio signal in time-frequency domain; the first radio sub-signal includes a target radio signal and the second-type radio signal, the target radio signal is one of the M first-type radio signals that is transmitted by the target antenna port group, the target radio signal carries the first bit block, and the second-type radio signal carries the second bit block.

In one embodiment, the first radio sub-signal is the first radio signal.

In one embodiment, the first radio sub-signal consists of the target radio signal and the second-type radio signal.

In one embodiment, the RE refers to Resource Element.

According to one aspect of the present disclosure, the above method is characterized in that: {a number of REs occupied by a second radio signal in time-frequency domain, a number of bits contained in a first bit block, a number of bits contained in a second bit block} are used for determining a number of REs occupied by the second-type radio signal in time-frequency domain; both the second radio signal and a target radio signal carry the first bit block, the second-type radio signal carries the second bit block, and the target radio signal is one of the M first-type radio signals that is transmitted by the target antenna port group; and the second radio signal is a first transmission of the first bit block, and the target radio signal is a retransmission of the first bit block.

In one embodiment, time domain resources occupied by the second radio signal are before time domain resources occupied by the first radio signal.

According to one aspect of the present disclosure, the method further includes:

transmitting a second signaling; and receiving the second radio signal.

Herein, the second signaling includes scheduling information of the second radio signal.

The present disclosure provides a UE device for wireless communication, wherein the UE device includes:

a first transmitter module, to transmit a first radio signal.

Herein, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used for determining the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group from the M antenna port groups.

Herein, one antenna port group includes a positive integer number of antenna ports, and the M is a positive integer greater than 1.

In one embodiment, the UE device for wireless communication includes:

a first receiver module, to receive first information.

Herein, the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 MCS indexes respectively, and a MCS index corresponding to one of the M first-type radio signals is equal to a maximum value in the M1 MCS indexes.

In one embodiment, the above UE device for wireless communication is characterized in that: the first receiver module further receives a first signaling, wherein the first signaling includes scheduling information of the first radio signal.

In one embodiment, the above UE device for wireless communication is characterized in that: the first receiver module further receives the M downlink signalings on the M time-frequency resources respectively, wherein the M downlink signalings include scheduling information of the M first-type radio signals respectively.

In one subembodiment, the above UE device for wireless communication is characterized in that: the first receiver module further receives M4 downlink signalings on M4 time-frequency resources respectively, wherein the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M.

In one embodiment, the above UE device for wireless communication is characterized in that: a target time-frequency resource belongs to a first time-frequency resource set, the target time-frequency resource is one of the M time-frequency resources that is corresponding to a target radio signal, and the target radio signal is one of the M first-type radio signals that is transmitted by the target antenna port group.

In one subembodiment, the above UE device for wireless communication is characterized in that: the first receiver module further receives a first downlink signaling, wherein the first downlink signaling is used for determining the first time-frequency resource set.

In one embodiment, the above UE device for wireless communication is characterized in that: {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one subembodiment, the above UE device for wireless communication is characterized in that: the first receiver module further receives a first reference signal, wherein the first reference signal is transmitted by the second antenna port group, and a measurement targeting the first reference signal is used for determining the third antenna port group.

In one subembodiment, the above UE device for wireless communication is characterized in that: the first transmitter module further transmits a second reference signal, wherein the second reference signal is transmitted by the third antenna port group, and a measurement targeting the second reference signal is used for determining the second antenna port group.

In one embodiment, the above UE device for wireless communication is characterized in that: {a number of REs occupied by a first radio sub-signal in time-frequency domain, a number of bits contained in a first bit block, a number of bits contained in a second bit block} are used for determining a number of REs occupied by the second-type radio signal in time-frequency domain; the first radio sub-signal includes a target radio signal and the second-type radio signal, the target radio signal is one of the M first-type radio signals that is transmitted by the target antenna port group, the target radio signal carries the first bit block, and the second-type radio signal carries the second bit block.

In one embodiment, the above UE device for wireless communication is characterized in that: {a number of REs occupied by a second radio signal in time-frequency domain, a number of bits contained in a first bit block, a number of bits contained in a second bit block} are used for determining a number of REs occupied by the second-type radio signal in time-frequency domain; both the second radio signal and a target radio signal carry the first bit block, the second-type radio signal carries the second bit block, and the target radio signal is one of the M first-type radio signals that is transmitted by the target antenna port group; and the second radio signal is a first transmission of the first bit block, and the target radio signal is a retransmission of the first bit block.

In one subembodiment, the above UE device for wireless communication is characterized in that: the first transmitter module further transmits the second radio signal.

In one subembodiment, the above UE device for wireless communication is characterized in that: the first receiver module further receives a second signaling, wherein the second signaling includes scheduling information of the second radio signal.

The present disclosure provides a base station device for wireless communication, wherein the base station device includes:

a second receiver module, to receive a first radio signal.

Herein, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used for determining the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group from the M antenna port groups.

Herein, one antenna port group includes a positive integer number of antenna ports, and the M is a positive integer greater than 1.

In one embodiment, the above base station device for wireless communication includes:

a second transmitter module, to transmit first information.

Herein, the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 MCS indexes respectively, and a MCS index corresponding to one of the M first-type radio signals is equal to a maximum value in the M1 MCS indexes.

In one embodiment, the above base station device for wireless communication is characterized in that: the second transmitter module further transmits a first signaling, wherein the first signaling includes scheduling information of the first radio signal.

In one embodiment, the above base station device for wireless communication is characterized in that: the second transmitter module further transmits the M downlink signalings on the M time-frequency resources respectively, wherein the M downlink signalings include scheduling information of the M first-type radio signals respectively.

In one subembodiment, the above base station device for wireless communication is characterized in that: the second transmitter module further transmits M4 downlink signalings on M4 time-frequency resources respectively, wherein the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M.

In one embodiment, the above base station device for wireless communication is characterized in that: a target time-frequency resource belongs to a first time-frequency resource set, the target time-frequency resource is one of the M time-frequency resources that is corresponding to a target radio signal, and the target radio signal is one of the M first-type radio signals that is transmitted by the target antenna port group.

In one subembodiment, the above base station device for wireless communication is characterized in that: the second transmitter module further transmits a first downlink signaling, wherein the first downlink signaling is used for determining the first time-frequency resource set.

In one embodiment, the above base station device for wireless communication is characterized in that: {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one subembodiment, the above base station device for wireless communication is characterized in that: the second transmitter module further transmits a first reference signal, wherein the first reference signal is transmitted by the second antenna port group, and a measurement targeting the first reference signal is used for determining the third antenna port group.

In one subembodiment, the above base station device for wireless communication is characterized in that: the second receiver module further receives a second reference signal, wherein the second reference signal is transmitted by the third antenna port group, and a measurement targeting the second reference signal is used for determining the second antenna port group.

In one embodiment, the above base station device for wireless communication is characterized in that: {a number of REs occupied by a first radio sub-signal in time-frequency domain, a number of bits contained in a first bit block, a number of bits contained in a second bit block} are used for determining a number of REs occupied by the second-type radio signal in time-frequency domain; the first radio sub-signal includes a target radio signal and the second-type radio signal, the target radio signal is one of the M first-type radio signals that is transmitted by the target antenna port group, the target radio signal carries the first bit block, and the second-type radio signal carries the second bit block.

In one embodiment, the above base station device for wireless communication is characterized in that: {a number of REs occupied by a second radio signal in time-frequency domain, a number of bits contained in a first bit block, a number of bits contained in a second bit block} are used for determining a number of REs occupied by the second-type radio signal in time-frequency domain; both the second radio signal and a target radio signal carry the first bit block, the second-type radio signal carries the second bit block, and the target radio signal is one of the M first-type radio signals that is transmitted by the target antenna port group; and the second radio signal is a first transmission of the first bit block, and the target radio signal is a retransmission of the first bit block.

In one subembodiment, the above base station device for wireless communication is characterized in that: the second receiver module further receives the second radio signal.

In one subembodiment, the above base station device for wireless communication is characterized in that: the second transmitter module further transmits a second signaling, wherein the second signaling includes scheduling information of the second radio signal.

In one embodiment, the present disclosure has the following benefits compared with traditional schemes.

When a UE transmits simultaneously data to multiple TRPs using different beams, and meanwhile carries uplink control information targeting part or all of the multiple TRPs in uplink physical layer data channels, a base station can indicate flexibly and dynamically a beam used to carry the uplink control information, so that the transmission of the uplink control information is directed to a corresponding target receiver all the time. This method guarantees the reception quality of the uplink control information by the target receiver of the uplink control information.

An antenna port group, that is, a beam, used to transmit uplink control information is indicated implicitly, and the related signaling overhead is reduced.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

Embodiment 1

Figure 1:
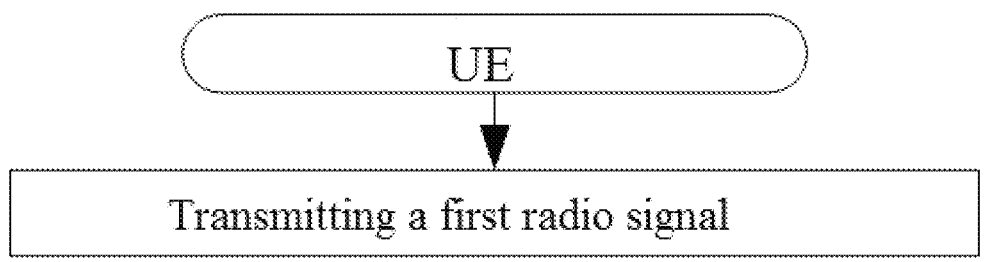
FIG. 1 is a flowchart of a first radio signal according to one embodiment of the present disclosure.

Embodiment 1 illustrates an example of a flowchart of a first radio signal, as shown in FIG. 1.

In Embodiment 1, the UE in the present disclosure transmits a first radio signal, wherein the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used for determining the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group from the M antenna port groups.

Herein, one antenna port group includes a positive integer number of antenna ports, and the M is a positive integer greater than 1.

In one embodiment, the uplink control information carried by the second-type radio signal is UCI.

In one embodiment, the uplink control information carried by the second-type radio signal includes at least one of {HARQ-ACK, CSI, RI, CQI, PMI, CRI}.

In one embodiment, the M is equal to 2.

In one embodiment, the M is greater than 2.

In one embodiment, a radio signal transmitted by the first antenna port group is data, and the uplink control information carried by the second-type radio signal is used for determining whether the data is correctly received.

In one subembodiment, the uplink control information carried by the second-type radio signal includes HARQ-ACK.

In one embodiment, a radio signal transmitted by the first antenna port group is a downlink reference signal, and a measurement targeting the downlink reference signal is used for generating the uplink control information carried by the second-type radio signal.

In one subembodiment, the downlink reference signal includes one or more of {SS, MIB/SIB, CSI-RS}.

In one subembodiment, the uplink control information carried by the second-type radio signal includes at least one of {CSI, RI, CQI, PMI, CRI}.

In one embodiment, one antenna port is formed by superposition of multiple antennas through antenna virtualization, and mapping coefficients from the multiple antennas to the antenna port constitute a beamforming vector corresponding to the antenna port.

In one subembodiment, one beamforming vector is formed by the product of one analog beamforming matrix and one digital beamforming vector.

In one embodiment, different antenna ports in one antenna port group correspond to a same analog beamforming matrix.

In one embodiment, different antenna ports in one antenna port group correspond to different digital beamforming vectors.

In one embodiment, antenna ports in different antenna port groups correspond to different analog beamforming matrixes.

In one embodiment, one antenna port group includes one antenna port.

In one subembodiment, an analog beamforming matrix corresponding to the antenna port group is dimensionally reduced to an analog beamforming vector, a beamforming vector corresponding to the antenna port group is same as the analog beamforming vector corresponding to the antenna port group.

In one embodiment, one antenna port group includes multiple antenna ports.

In one embodiment, the M downlink signalings are dynamic signalings respectively.

In one embodiment, the M downlink signalings are dynamic signalings for uplink grant respectively.

In one embodiment, the M downlink signalings include DCIs respectively.

In one embodiment, the M downlink signalings include uplink grant DCIs respectively.

In one embodiment, the M downlink signalings include scheduling information of the M first-type radio signals respectively.

In one embodiment, the M time-frequency resources include a positive integer number of REs respectively.

In one embodiment, one RE occupies a duration of one multicarrier symbol in time domain, and occupies a bandwidth of one subcarrier in frequency domain.

In one subembodiment, the multicarrier symbol is an OFDM symbol.

In one subembodiment, the multicarrier symbol is a DFT-S-OFDM symbol.

In one subembodiment, the multicarrier symbol is an FBMC symbol.

In one embodiment, the M time-frequency resources are M CORESETs respectively.

In one embodiment, the M time-frequency resources are M search spaces respectively.

In one embodiment, the phrase that the M downlink signalings are searched for in the M time-frequency resources respectively refers that: the UE monitors the M downlink signalings in the M time-frequency resources respectively.

In one subembodiment, the UE monitors the M downlink signalings in the M time-frequency resources respectively via blind decoding, that is, receiving a signal in any one time-frequency resource of the M time-frequency resources and performing decoding; if the decoding is determined to be correct according to a check bit, it is judged that the reception is successful; otherwise, it is judged that the reception is failed.

In one embodiment, the first information is carried by a higher layer signaling.

In one embodiment, the first information is carried by an RRC signaling.

In one embodiment, the first information is carried by a physical layer signaling.

In one embodiment, the first information is carried by both a higher layer signaling and a physical layer signaling.

In one embodiment, the M first-type radio signals occupy same frequency domain resources.

In one embodiment, the M first-type radio signals occupy same time domain resources.

In one embodiment, frequency domain resources occupied by any two first-type radio signals of the M first-type radio signals are completely overlapping or partially overlapping.

In one embodiment, time domain resources occupied by any two first-type radio signals of the M first-type radio signals are completely overlapping or partially overlapping.

In one embodiment, the second-type radio signal and any one first-type radio signal of the M first-type radio signals occupy same time domain resources.

In one embodiment, time domain resources occupied by the second-type radio signal and by any of the M first-type radio signals are completely overlapping or partially overlapping.

In one embodiment, frequency domain resources occupied by the second-type radio signal and by a target radio signal are partially overlapping, and the target radio signal is one of the M first-type radio signals that is transmitted by the target antenna port group.

In one embodiment, the M first-type radio signals are transmitted on one same uplink physical layer data channel (that is, an uplink channel capable of carrying physical layer data).

In one subembodiment, the first radio signal is transmitted on the uplink physical layer data channel.

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the M first-type radio signals are transmitted on M uplink physical layer data channels (that is, uplink channels capable of carrying physical layer data) respectively.

In one subembodiment, the second-type radio signal is transmitted on one of the M uplink physical layer data channels.

In one subembodiment, the M uplink physical layer data channels are PUSCHs respectively.

In one subembodiment, the M uplink physical layer data channels are sPUSCHs respectively.

In one subembodiment, the M uplink physical layer data channels are NR-PUSCHs respectively.

In one subembodiment, the M uplink physical layer data channels are NB-PUSCHs respectively.

In one embodiment, the second-type radio signal and a target radio signal are transmitted on one same uplink physical layer data channel (that is, an uplink channel capable of carrying physical layer data), and the target radio signal is one of the M first-type radio signals that is transmitted by the target antenna port group.

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the M downlink signalings are transmitted on M downlink physical layer control channels (that is, downlink channels capable of carrying physical layer signalings only) respectively.

In one subembodiment, the M downlink physical layer control channels are PDCCHs respectively.

In one subembodiment, the M downlink physical layer control channels are sPDCCHs respectively.

In one subembodiment, the M downlink physical layer control channels are NR-PDCCHs respectively.

In one subembodiment, the M downlink physical layer control channels are NB-PDCCHs respectively.

Embodiment 2

Figure 2:
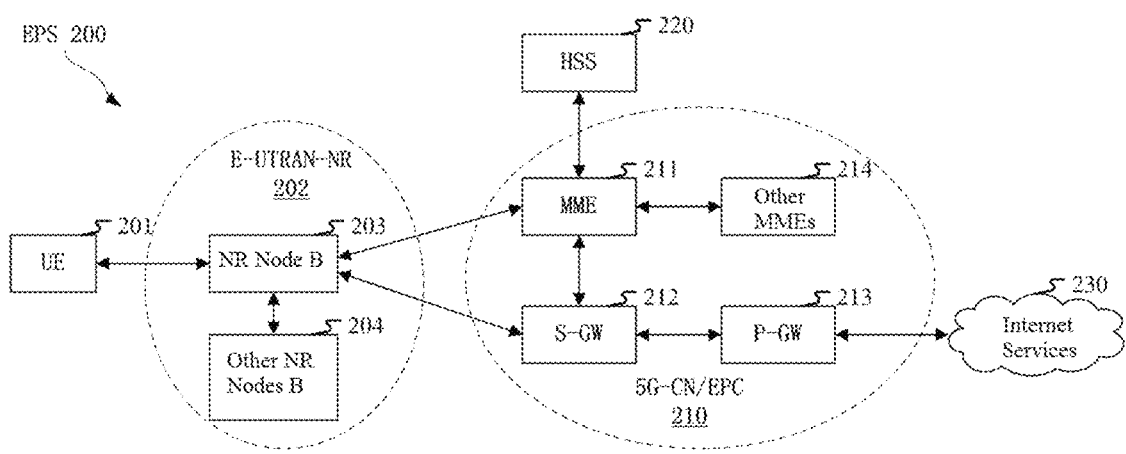
FIG. 2 is a diagram illustrating a network architecture according to one embodiment of the present disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE, LTE-A and 5G network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the UE in the present disclosure.

In one embodiment, the gNB 203 corresponds to the base station in the present disclosure.

Embodiment 3

Figure 3:
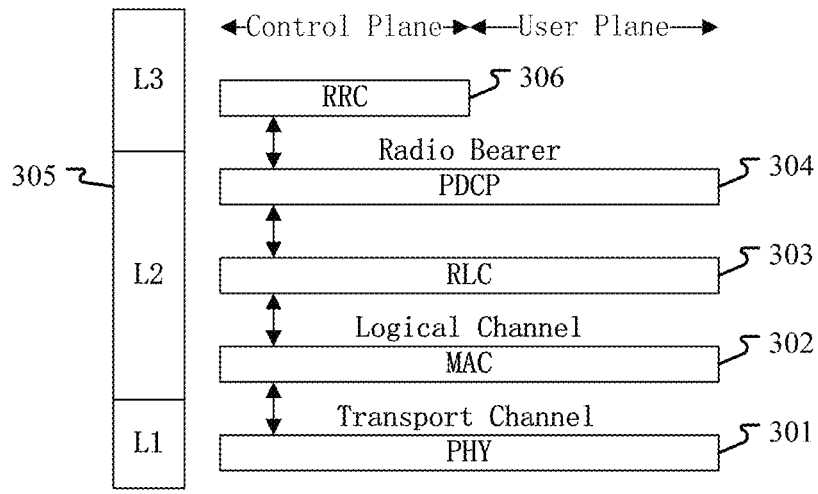
FIG. 3 is a diagram illustrating an embodiment of a radio protocol architecture of a user plane and a control plane according to one embodiment of the present disclosure.

Embodiment 3 illustrates an example of a diagram of an embodiment of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at the P-GW 213 of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce the radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first radio signal in the present disclosure is generated by the PHY 301.

In one embodiment, the M first-type radio signals in the present disclosure are generated by the PHY 301.

In one embodiment, the second-type radio signal in the present disclosure is generated by the PHY 301.

In one embodiment, the M downlink signalings in the present disclosure are generated by the PHY 301.

In one embodiment, the first information in the present disclosure is generated by the PHY 301.

In one embodiment, the first information in the present disclosure is generated by the MAC sublayer 302.

In one embodiment, the first information in the present disclosure is generated by the RRC sublayer 306.

In one embodiment, the first signaling in the present disclosure is generated by the PHY 301.

In one embodiment, the first bit block in the present disclosure is generated by the MAC sublayer 302.

In one embodiment, the first bit block in the present disclosure is generated by the RRC sublayer 306.

In one embodiment, the second bit block in the present disclosure is generated by the PHY 301.

In one embodiment, the second radio signal in the present disclosure is generated by the PHY 301.

In one embodiment, the second signaling in the present disclosure is generated by the PHY 301.

Embodiment 4

Figure 4:
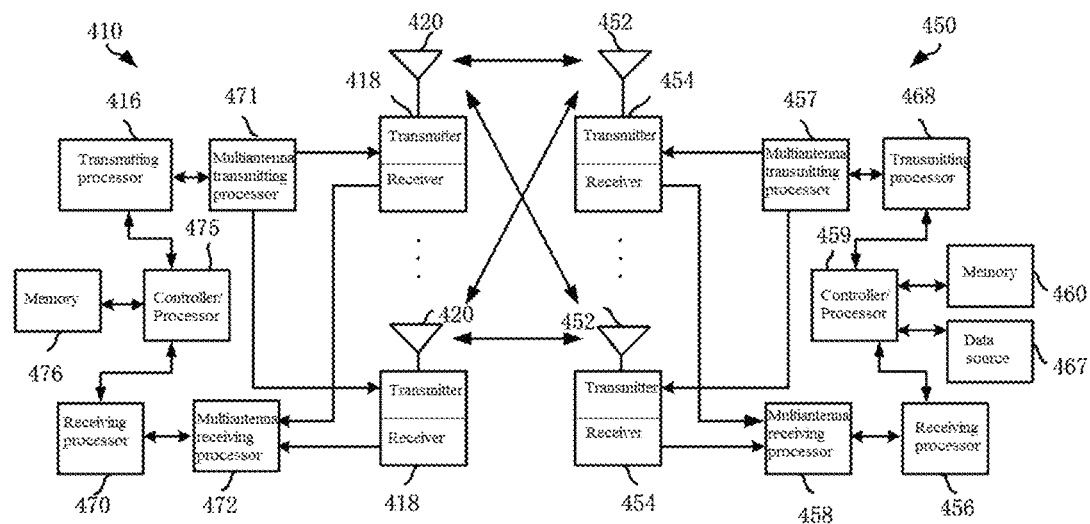
FIG. 4 is a diagram illustrating a New Radio (NR) node and a UE according to one embodiment of the present disclosure.

Embodiment 4 illustrates an example of a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and antenna 452.

In Downlink (DL) transmission, at the gNB 410, a higher-layer packet from a core network is provided to the controller/processor 475. The controller/processor 475 provides a function of a layer 2. In downlink transmission, the controller/processor 475 provides header compression, encryption, packet segmentation and reordering, multiplexing between a logical channel and a transport channel, and radio resource allocation for the UE 450 based on various priorities. The controller/processor 475 is also in charge of HARQ operation, retransmission of a lost packet, and a signaling to the UE450. The transmitting processor 416 and the multi-antenna transmitting processor 471 perform signal processing functions used for a layer 1 (that is, physical layer). The transmitting processor 416 performs encoding and interleaving so as to enable a FEC (Forward Error Correction) and the mapping to signal clusters corresponding to each modulation scheme (i.e., BPSK, QPSK, M-PSK M-QAM, etc.) at the UE 450 side. The multi-antenna transmitting processor 471 processes the encoded and modulated symbols by a digital spatial precoding/beamforming operation to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In downlink transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform signal processing functions of the layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In the frequency domain, a physical layer data signal and a reference signal are de-multiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of the layer 2. The controller/processor 459 may be connected to the memory 460 that stores program codes and data. The memory 460 may be called a computer readable media. In downlink transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above layer 2, or various control signals can be provided to the layer 3 for processing. The controller/processor 459 can also perform error detection using ACK and/or NACK protocols to support the HARQ operation.

In the uplink transmission, at the UE 450, the data source 467 provides a higher-layer packet to the controller/processor 459. The data source 467 represents all protocol layers above the L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of the layer 2 used for the control plane and user plane. The controller/processor 459 is also in charge of HARQ operation, retransmission of a lost packet, and signaling to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of the layer 1. The controller/processor 475 provides functions of the layer 2. The controller/processor 475 may be connected to the memory 476 that stores program codes and data. The memory 476 may be called a computer readable media. In uplink transmission, the controller/processor 475 provides de-multiplexing between the transport channel and the logical channel, packet reassembling, decryption, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor.

In one embodiment, the UE 450 includes a memory that stores a computer readable instruction program. The computer readable instruction program generates an action when executed by at least one processor. The action includes: transmitting the first radio signal in the present disclosure, receiving the M downlink signals in the present disclosure on the M time-frequency resources in the present disclosure respectively, receiving the first information in the present disclosure, receiving the first signaling in the present disclosure, transmitting the second radio signal in the present disclosure, and receiving the second signaling in the present disclosure.

In one embodiment, the gNB 410 includes at least one processor and at least one memory. The at least one memory includes computer program codes. The at least one memory and the computer program codes are configured to be used in collaboration with the at least one processor.

In one embodiment, the gNB 410 includes a memory that stores a computer readable instruction program. The computer readable instruction program generates an action when executed by at least one processor. The action includes: receiving the first radio signal in the present disclosure, transmitting the M downlink signals in the present disclosure on the M time-frequency resources in the present disclosure respectively, transmitting the first information in the present disclosure, transmitting the first signaling in the present disclosure, receiving the second radio signal in the present disclosure, and transmitting the second signaling in the present disclosure.

In one embodiment, the UE 450 corresponds to the UE in the present disclosure.

In one embodiment, the gNB 410 corresponds to the base station in the present disclosure.

In one embodiment, at least one of {the antenna 420, the receiver 418, the receiving processor 470, the multi-antenna receiving processor 472, the controller/processor 475} is used for receiving the first radio signal; and at least one of {the antenna 452, the transmitter 454, the transmitting processor 468, the multi-antenna transmitting processor 457, the controller/processor 459} is used for transmitting the first radio signal.

In one embodiment, at least one of {the antenna 452, the receiver 454, the receiving processor 456, the multi-antenna receiving processor 458, the controller/processor 459} is used for receiving the M downlink signalings; and at least one of {the antenna 420, the transmitter 418, the transmitting processor 416, the multi-antenna transmitting processor 471, the controller/processor 475} is used for transmitting the M downlink signalings.

In one embodiment, at least one of {the antenna 452, the receiver 454, the receiving processor 456, the multi-antenna receiving processor 458, the controller/processor 459} is used for receiving the first information; and at least one of {the antenna 420, the transmitter 418, the transmitting processor 416, the multi-antenna transmitting processor 471, the controller/processor 475} is used for transmitting the first information.

In one embodiment, at least one of {the antenna 452, the receiver 454, the receiving processor 456, the multi-antenna receiving processor 458, the controller/processor 459} is used for receiving the first signaling; and at least one of {the antenna 420, the transmitter 418, the transmitting processor 416, the multi-antenna transmitting processor 471, the controller/processor 475} is used for transmitting the first signaling.

In one embodiment, at least one of {the antenna 420, the receiver 418, the receiving processor 470, the multi-antenna receiving processor 472, the controller/processor 475} is used for receiving the second radio signal; and at least one of {the antenna 452, the transmitter 454, the transmitting processor 468, the multi-antenna transmitting processor 457, the controller/processor 459} is used for transmitting the second radio signal.

In one embodiment, at least one of {the antenna 452, the receiver 454, the receiving processor 456, the multi-antenna receiving processor 458, the controller/processor 459} is used for receiving the second signaling; and at least one of {the antenna 420, the transmitter 418, the transmitting processor 416, the multi-antenna transmitting processor 471, the controller/processor 475} is used for transmitting the second signaling.

Embodiment 5

Figure 5:
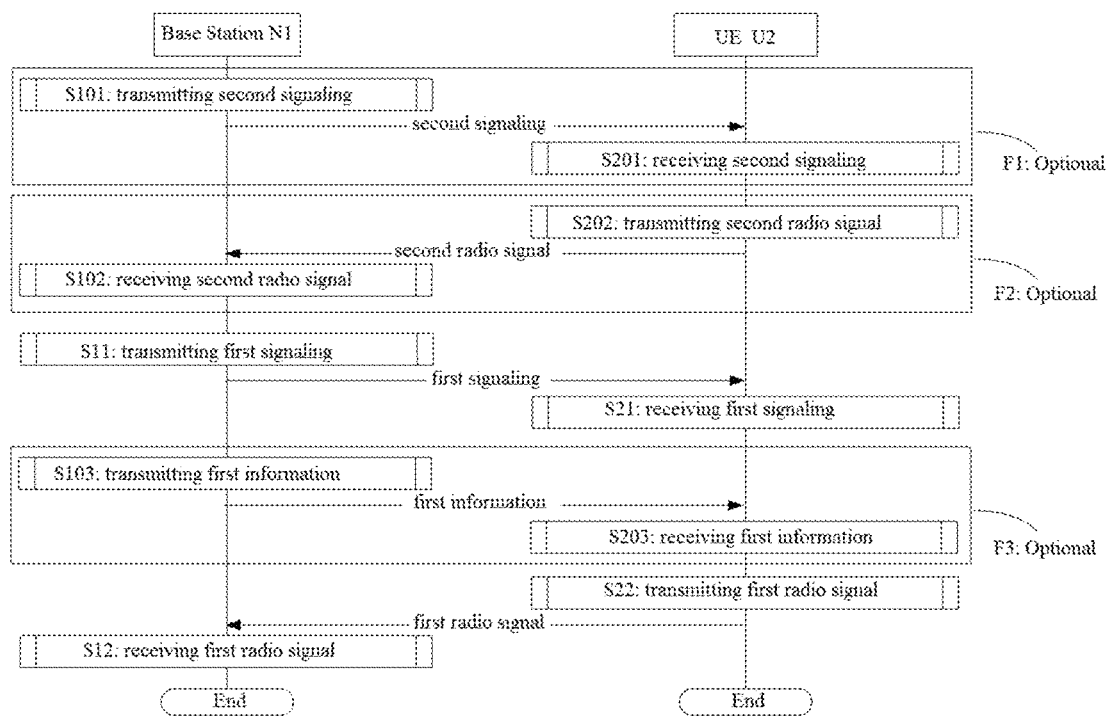
FIG. 5 is a flowchart of wireless transmission according to one embodiment of the present disclosure.

Embodiment 5 illustrates an example of a flowchart of wireless transmission, as shown in FIG. 5. In FIG. 5, the base station N1 is a maintenance base station for a serving cell of the UE U2. In FIG. 5, steps marked in boxes F1, F2 and F3 are optional respectively.

The N1 transmits a second signaling in S101, receives a second radio signal in S102, transmits a first signaling in S11, transmits first information in S103, and receives a first radio signal in S12.

The U2 receives a second signaling in S201, transmits a second radio signal in S202, receives a first signaling in S21, receives first information in S203, and transmits a first radio signal in S22.

In Embodiment 5, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used by the U2 to determine the target antenna port group from the M antenna port groups:

a first antenna port group, wherein a reception for a radio signal transmitted by the first antenna port group is used by the U2 to generate the uplink control information carried by the second-type radio signal; and the first information, wherein the first information indicates explicitly the target antenna port group from the M antenna port groups.

Herein, one antenna port group includes a positive integer number of antenna ports, and the M is a positive integer greater than 1. The first signaling includes scheduling information of the first radio signal. Both the second radio signal and a target radio signal carry a first bit block; the target radio signal is one of the M first-type radio signals that is transmitted by the target antenna port group; and the second signaling includes scheduling information of the second radio signal.

In one embodiment, the M is equal to 2.

In one embodiment, the M is greater than 2.

In one embodiment, a radio signal transmitted by the first antenna port group is data, and the uplink control information carried by the second-type radio signal is used by the N1 to determine whether the data is correctly received.

In one subembodiment, the uplink control information carried by the second-type radio signal includes HARQ-ACK.

In one embodiment, a radio signal transmitted by the first antenna port group is a downlink reference signal, and a measurement targeting the downlink reference signal is used by the U2 to generate the uplink control information carried by the second-type radio signal.

In one subembodiment, the downlink reference signal includes one or more of {SS, MIB/SIB, CSI-RS}.

In one subembodiment, the uplink control information carried by the second-type radio signal includes at least one of {CSI, RI, CQI, PMI, CRI}.

In one embodiment, the M first-type radio signals are transmitted on one same uplink physical layer data channel (that is, an uplink channel capable of carrying physical layer data).

In one subembodiment, the first radio signal is transmitted on the uplink physical layer data channel.

In one embodiment, the first signaling is used by the U2 to determine the first information.

In one embodiment, the first signaling indicates explicitly the first information.

In one embodiment, the first signaling indicates implicitly the first information.

In one embodiment, the first information is determined by both a higher layer signaling and the first signaling.

In one embodiment, the first information is used by the U2 to determine the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 MCS indexes respectively, and a MCS index corresponding to one of the M first-type radio signals is equal to a maximum value in the M1 MCS indexes.

In one subembodiment, the M antenna port groups are a subset of the M1 antenna port groups, and the M first-type radio signals are a subset of the M1 first-type radio signals.

In one subembodiment, the M1 is equal to the M.

In one subembodiment, the M1 is greater than the M.

In one subembodiment, the M1 is equal to 2.

In one subembodiment, the M1 is greater than 2.

In one subembodiment, any one MCS index of the M1 MCS indexes is $I_{MCS}$, and refer to TS 36.213 for a specific definition of the $I_{MCS}$.

In one subembodiment, any of the M1 MCS indexes is a non-negative integer.

In one embodiment, the first signaling is transmitted on a downlink physical layer control channel (that is, a downlink channel capable of carrying physical layer signalings only).

In one embodiment, the first signaling is a dynamic signaling for uplink grant.

In one embodiment, the first signaling includes an uplink grant DCI.

In one embodiment, {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one subembodiment, the N1 transmits a first reference signal, and the U2 receives the first reference signal, wherein the first reference signal is transmitted by the second antenna port group, and a measurement targeting the first reference signal is used by the U2 to determine the third antenna port group.

In one subembodiment, the U2 transmits a second reference signal, and the N1 receives the second reference signal, wherein the second reference signal is transmitted by the third antenna port group, and a measurement targeting the second reference signal is used by the N1 to determine the second antenna port group.

In one subembodiment, the QCLed refers to Quasi Co-Located.

In one subembodiment, two antenna port groups being QCLed refers that: any antenna port in one of the two antenna port groups is QCLed with at least one antenna port in another of the two antenna port groups.

In one subembodiment, two antenna port groups being QCLed refers that: any antenna port in one of the two antenna port groups is QCLed with any antenna port in another of the two antenna port groups.

In one embodiment, {a number of REs occupied by a first radio sub-signal in time-frequency domain, a number of bits contained in the first bit block, a number of bits contained in a second bit block} are used by the U2 to determine a number of REs occupied by the second-type radio signal in time-frequency domain; the first radio sub-signal includes the target radio signal and the second-type radio signal, and the second-type radio signal carries the second bit block.

In one subembodiment, both boxes F1 and F2 shown in FIG. 5 are not present.

In one subembodiment, the target radio signal is a first transmission of the first bit block.

In one subembodiment, the first radio sub-signal is the first radio signal.

In one subembodiment, the first radio sub-signal consists of the target radio signal and the second-type radio signal.

In one subembodiment, the RE refers to Resource Element.

In one embodiment, {a number of REs occupied by the second radio signal in time-frequency domain, a number of bits contained in the first bit block, a number of bits contained in a second bit block} are used by the U2 to determine a number of REs occupied by the second-type radio signal in time-frequency domain; and the second-type radio signal carries the second bit block.

In one subembodiment, both boxes F1 and F2 shown in FIG. 5 are present.

In one subembodiment, the second radio signal is a first transmission of the first bit block, and the target radio signal is a retransmission of the first bit block.

In one subembodiment, the RE refers to Resource Element.

In one embodiment, the box F3 shown in FIG. 5 is present.

In one embodiment, the box F3 shown in FIG. 5 is not present.

Embodiment 6

Figure 6:
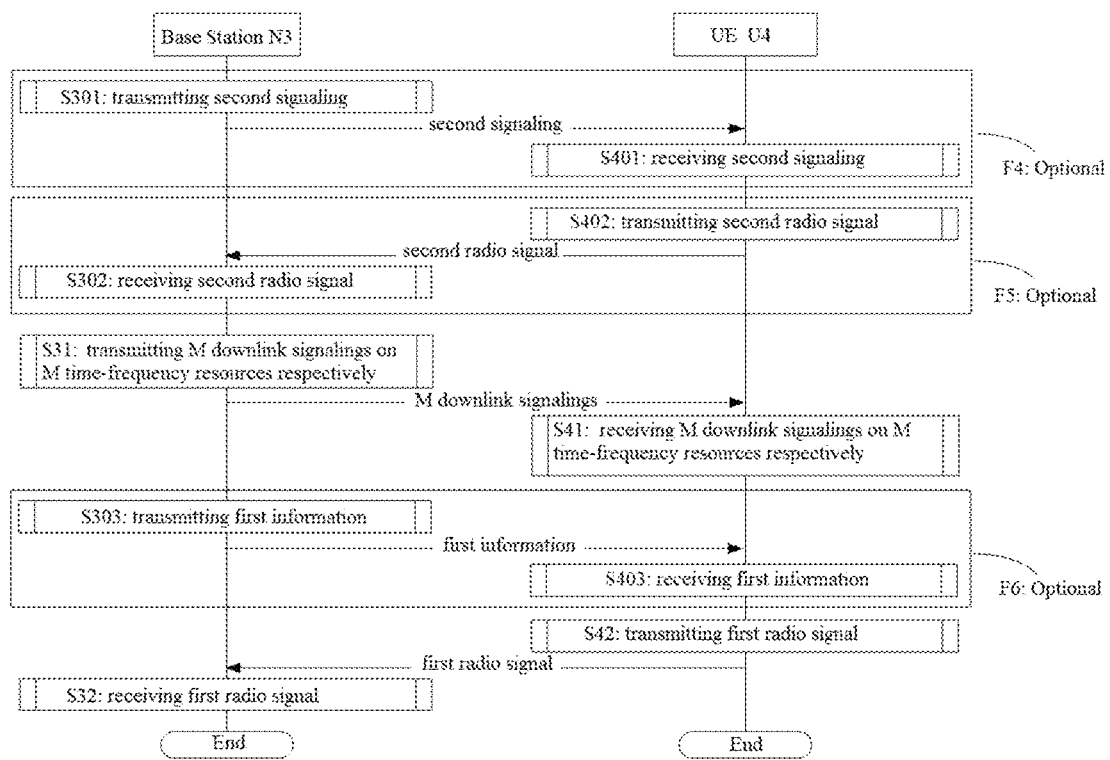
FIG. 6 is a flowchart of wireless transmission according to another embodiment of the present disclosure.

Embodiment 6 illustrates an example of a flowchart of wireless transmission, as shown in FIG. 6. In FIG. 6, the base station N3 is a maintenance base station for a serving cell of the UE U4. In FIG. 6, steps marked in boxes F4, F5 and F6 are optional respectively.

The N3 transmits a second signaling in S301, receives a second radio signal in S302, transmits M downlink signalings on M time-frequency resources respectively in S31, transmits first information in S303, and receives a first radio signal in S32.

The U4 receives a second signaling in S401, transmits a second radio signal in S402, receives M downlink signalings on M time-frequency resources respectively in S41, receives first information in S403, and transmits a first radio signal in S42.

In Embodiment 6, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used by the U4 to determine the target antenna port group from the M antenna port groups:

a first antenna port group, wherein a reception for a radio signal transmitted by the first antenna port group is used by the U4 to generate the uplink control information carried by the second-type radio signal; and the M time-frequency resources, wherein the M first-type radio signals are scheduled by the M downlink signalings respectively, and the M downlink signalings are searched for by the U4 in the M time-frequency resources respectively; and, the first information, wherein the first information indicates explicitly the target antenna port group from the M antenna port groups.

Herein, one antenna port group includes a positive integer number of antenna ports, and the M is a positive integer greater than 1. The M downlink signalings include scheduling information of the M first-type radio signals respectively; both the second radio signal and a target radio signal carry a first bit block; the target radio signal is one of the M first-type radio signals that is transmitted by the target antenna port group; and the second signaling includes scheduling information of the second radio signal.

In one embodiment, the M downlink signalings are dynamic signalings for uplink grant, respectively.

In one embodiment, the M downlink signalings include uplink grant DCIs respectively.

In one embodiment, the M first-type radio signals are transmitted on M uplink physical layer data channels (that is, uplink channels capable of carrying physical layer data) respectively.

In one subembodiment, the second-type radio signal is transmitted on one of the M uplink physical layer data channels.

In one embodiment, the second-type radio signal and the target radio signal are transmitted on one same uplink physical layer data channel (that is, an uplink channel capable of carrying physical layer data).

In one embodiment, the M downlink signalings are transmitted on M downlink physical layer control channels (that is, downlink channels capable of carrying physical layer signalings only) respectively.

In one embodiment, the U4 receives M4 downlink signalings on M4 time-frequency resources respectively, wherein the first radio signal consists of M1 first-type radio signals and the second-type radio signal, the M1 first-type radio signals are transmitted by M1 antenna port groups respectively, and the M1 is a positive integer greater than or equal to the M; the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M In one embodiment, a target time-frequency resource belongs to a first time-frequency resource set, the target time-frequency resource is one of the M time-frequency resources that is corresponding to the target radio signal.

In one subembodiment, the U4 further receives a first downlink signaling, wherein the first downlink signaling is used by the U4 to determine the first time-frequency resource set.

In one reference embodiment of the above subembodiment, the first downlink signaling is a higher layer signaling.

In one embodiment, both boxes F4 and F5 shown in FIG. 6 are not present.

In one subembodiment, the target radio signal is a first transmission of the first bit block.

In one embodiment, both boxes F4 and F5 shown in FIG. 6 are present.

In one subembodiment, the second radio signal is a first transmission of the first bit block, and the target radio signal is a retransmission of the first bit block.

In one embodiment, the box F6 shown in FIG. 6 is present.

In one embodiment, the box F6 shown in FIG. 6 is not present.

Embodiment 7

Figure 7:
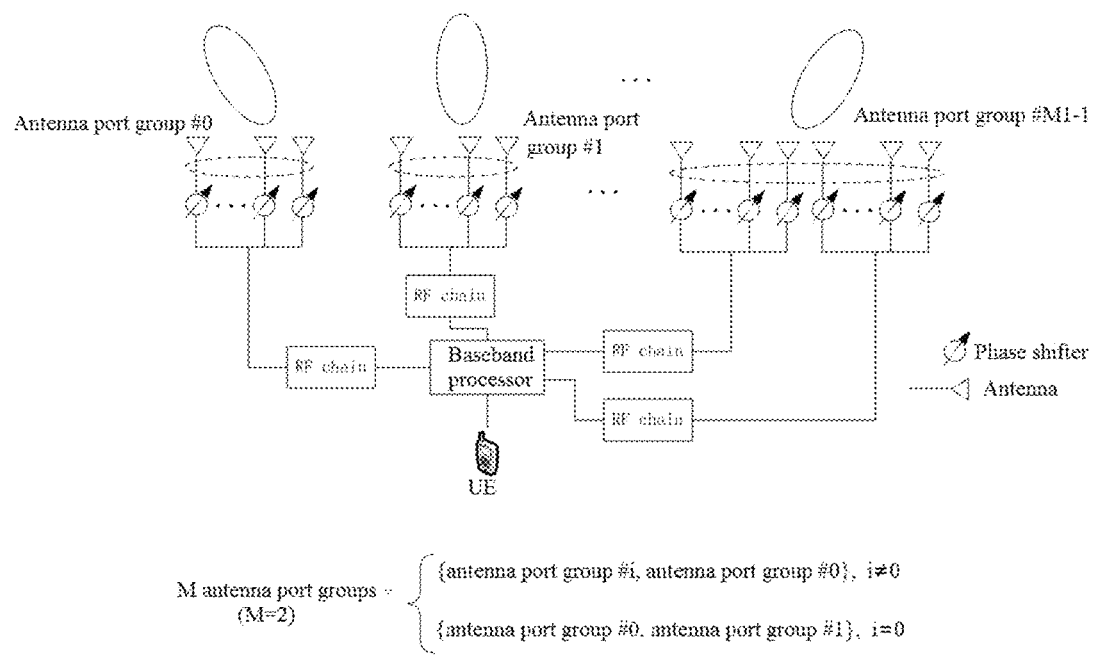
FIG. 7 is a diagram illustrating a relationship between M1 antenna port groups and M antenna port groups according to one embodiment of the present disclosure.

Embodiment 7 illustrates an example of a diagram of a relationship between M1 antenna port groups and M antenna port groups, as shown in FIG. 7.

In Embodiment 7, the first radio signal in the present disclosure consists of M1 first-type radio signals and a second-type radio signal, the M1 first-type radio signals are transmitted by M1 antenna port groups respectively, the second-type radio signal is transmitted by a target antenna port group, the target antenna port group is one of M antenna port groups, and the M antenna port groups are a subset of the M1 antenna port groups; M first-type radio signals are a subset of the M1 first-type radio signals, and the M first-type radio signals are transmitted by the M antenna port groups respectively; and the M is equal to 2. The M1 first-type radio signals correspond to M1 MCS indexes respectively, and a MCS index corresponding to one of the M first-type radio signals is equal to a maximum value in the M1 MCS indexes, an index of an antenna port group corresponding to the one of the M first-type radio signals in the M1 antenna port groups is i, and the i is a non-negative integer less than the M. The first information in the present disclosure indicates explicitly the target antenna port group from the M antenna port groups.

In FIG. 7, one antenna port group includes a positive integer number of antenna ports. One antenna port is formed by superposition of antennas in a positive integer number of antenna groups through virtualization, and one antenna group includes a positive integer number of antennas. One antenna group is connected to a baseband processor through one Radio Frequency (RF) chain, and different antenna groups are connected to different RF chains. Mapping coefficients from multiple antennas included in any of the positive integer number of antenna groups to the antenna port constitute an analog beamforming vector of the antenna group. Analog beamforming vectors corresponding to the positive integer number of antenna groups are diagonally arranged to constitute an analog beamforming matrix of the antenna port. Mapping coefficients from the positive integer number of antenna groups to the antenna port constitute a digital beamforming vector of the antenna port.

In FIG. 7, indexes of the M1 antenna port groups are {#0, #1, . . . , #M1-1} respectively. The antenna port group corresponding to the one of the M first-type radio signals is antenna port group #i.

In one embodiment, any of the M1 MCS indexes is $I_{MCS}$, and refer to TS 36.213 for a specific definition of the $I_{MCS}$.

In one embodiment, an index of an antenna port group corresponding to another of the M first-type radio signals in the M1 antenna port groups is default (no configuration is needed).

In one embodiment, an index of an antenna port group corresponding to another of the M first-type radio signals in the M1 antenna port groups is preconfigured.

In one embodiment, the i is greater than 0, and an index of an antenna port group corresponding to another of the M first-type radio signals in the M1 antenna port groups is 0, that is, the M antenna port groups are {antenna port group #i, antenna port group #0}.

In one embodiment, the i is equal to 0, and an index of an antenna port group corresponding to another of the M first-type radio signals in the M1 antenna port groups is 1, that is, the M antenna port groups are {antenna port group #0, antenna port group #1}.

In one embodiment, different antenna ports in one antenna port group correspond to a same analog beamforming matrix.

In one embodiment, different antenna ports in one antenna port group correspond to different digital beamforming vectors.

In one embodiment, antenna ports in different antenna port groups correspond to different analog beamforming matrixes.

In one embodiment, one antenna port group includes one antenna port.

In one subembodiment, an analog beamforming matrix corresponding to the antenna port group is dimensionally reduced to an analog beamforming vector, and a beamforming vector corresponding to the antenna port group is same as the analog beamforming vector corresponding to the antenna port group.

In one embodiment, one antenna port group includes multiple antenna ports.

In one embodiment, the first information includes one bit; when the one bit included in the first information is equal to 0, the target antenna port group is an antenna port group corresponding to the one of the M first-type radio signals; when the one bit included in the first information is equal to 1, the target antenna port group is an antenna port group corresponding to another of the M first-type radio signals.

In one embodiment, the first information includes one bit; when the one bit included in the first information is equal to 1, the target antenna port group is an antenna port group corresponding to the one of the M first-type radio signals; when the one bit included in the first information is equal to 0, the target antenna port group is an antenna port group corresponding to another of the M first-type radio signals.

In one embodiment, the first signaling in the present disclosure is used by the U4 to determine the first information.

In one embodiment, the first signaling indicates explicitly the first information.

In one subembodiment, the first signaling includes a second field, and the second field in the first signaling indicates the first information.

In one embodiment, the first signaling indicates implicitly the first information.

In one embodiment, a format of the first signaling is used by the U4 to determine the first information.

In one embodiment, if a format of the first signaling belongs to a first format set, the target antenna port group is an antenna port group corresponding to the one of the M first-type radio signals; if the format of the first signaling belongs to a second format set, the target antenna port group is an antenna port group corresponding to another of the M first-type radio signals. The first format set and the second format set include a positive integer number of formats respectively.

In one embodiment, a payload size of the first signaling is used by the U4 to determine the first information.

In one embodiment, the first information is a payload size of the first signaling.

In one embodiment, if a payload size of the first signaling belongs to a first size set, the target antenna port group is an antenna port group corresponding to the one of the M first-type radio signals; if the payload size of the first signaling belongs to a second size set, the target antenna port group is an antenna port group corresponding to another of the M first-type radio signals. The first size set and the second size set include a positive integer number of payload sizes respectively.

In one embodiment, the M1 antenna port groups are used by the U4 to determine the first information, and the first information indicates the M1 antenna port groups.

In one embodiment, if all antenna ports in the M1 antenna port groups belong to one of {a first port group set, a second port group set} only, the target antenna port group is an antenna port group corresponding to the one of the M first-type radio signals; if a part of the antenna ports in the M1 antenna port groups belong to the first port group set, and another part of the antenna ports in the M1 antenna port groups belong to the second port group set, the target antenna port group is an antenna port group corresponding to another of the M first-type radio signals. The first port group set and the second port group set include a positive integer number of antenna port groups respectively.

In one subembodiment, any antenna port in the first port group set and any antenna port in the second port group set are not QCLed.

In one subembodiment, a transmitter of a radio signal transmitted from an antenna port in the first port group set is a first node, a transmitter of a radio signal transmitted from an antenna port in the second port group set is a second node, the first node and the second node have different IDs.

In one reference embodiment of the above subembodiment, the IDs of the first node and the second node are PCIs respectively.

In one embodiment, the first information is determined by both a higher layer signaling and the first signaling.

Embodiment 8

Figure 8:
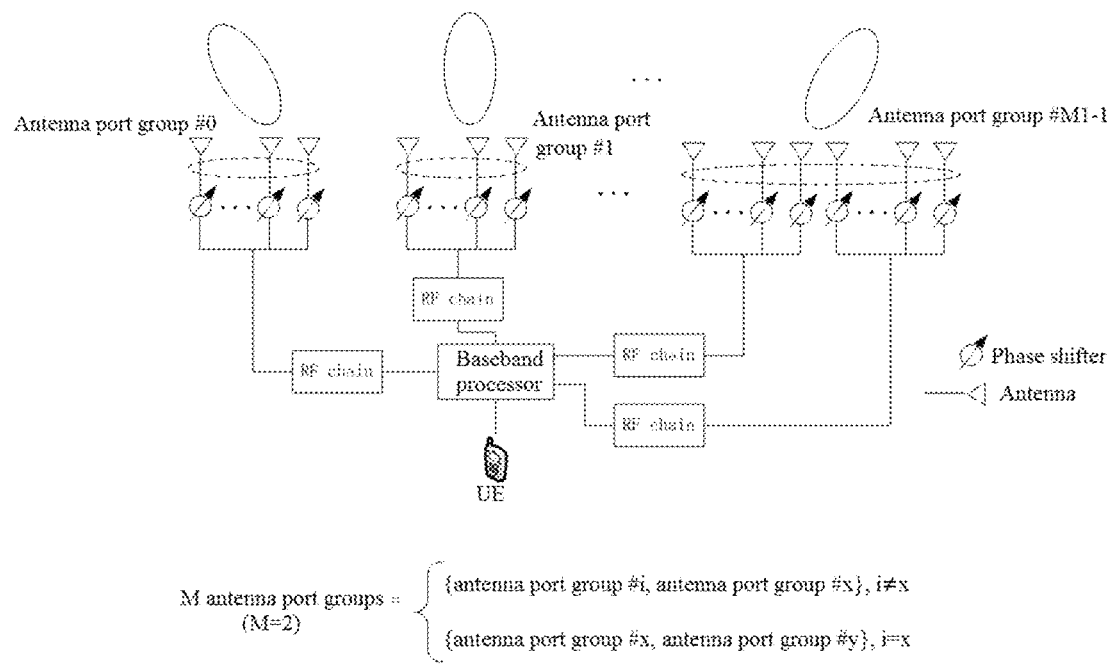
FIG. 8 is a diagram illustrating a relationship between M1 antenna port groups and M antenna port groups according to another embodiment of the present disclosure.

Embodiment 8 illustrates an example of a diagram of a relationship between M1 antenna port groups and M antenna port groups, as shown in FIG. 8.

In Embodiment 8, the first radio signal in the present disclosure consists of M1 first-type radio signals and a second-type radio signal, the M1 first-type radio signals are transmitted by M1 antenna port groups respectively, the second-type radio signal is transmitted by a target antenna port group, the target antenna port group is one of M antenna port groups, and the M antenna port groups are a subset of the M1 antenna port groups; M first-type radio signals are a subset of the M1 first-type radio signals, and the M first-type radio signals are transmitted by the M antenna port groups respectively; and the M is equal to 2. The M1 first-type radio signals correspond to M1 MCS indexes respectively, and a MCS index corresponding to one of the M first-type radio signals is equal to a maximum value in the M1 MCS indexes, an index of an antenna port group corresponding to the one of the M first-type radio signals in the M1 antenna port groups is i, and the i is a non-negative integer less than the M. In FIG. 8, indexes of the M1 antenna port groups are {™0, #1, . . . , #M1-1} respectively. The antenna port group corresponding to the one of the M first-type radio signals is antenna port group #i. The M1 antenna port groups all belong to a first port group set, and the first port group set includes a positive integer number of antenna port groups. Antenna port group #x is one of the M1 antenna port groups that has a minimum index in the first port group set, antenna port group #y is one of the M1 antenna port groups that has a second minimum index in the first port group set, the x and the y are non-negative integers less than the M respectively, and the x is not equal to the y. The first information in the present disclosure indicates explicitly the target antenna port group from the M antenna port groups.

In one embodiment, the i is not equal to the x, and the M antenna port groups are {antenna port group #i, antenna port group #x}.

In one embodiment, the i is equal to the x, and the M antenna port groups are {antenna port group #x, antenna port group #y}.

Embodiment 9

Figure 9:
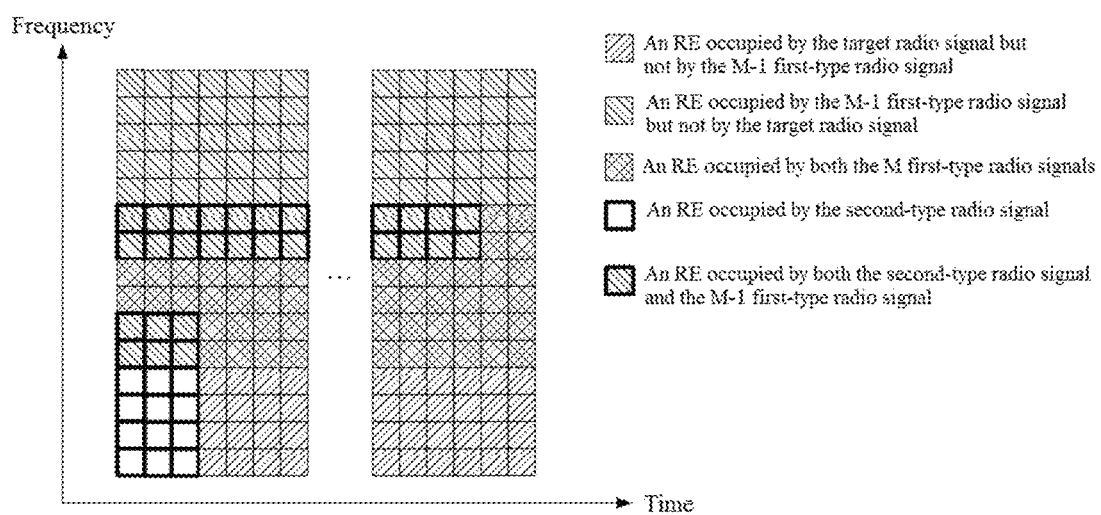
FIG. 9 is a diagram illustrating resource mapping of M first-type radio signals and a second-type radio signal in time-frequency domain according to one embodiment of the present disclosure.

Embodiment 9 illustrates an example of a diagram of resource mapping of M first-type radio signals and a second-type radio signal in time-frequency domain, as shown in FIG. 9.

In Embodiment 9, the M is equal to 2, the M first-type radio signals are transmitted by M antenna port groups respectively, and the second-type radio signal is transmitted by an antenna port group corresponding to a target radio signal; the target radio signal is one of the M first-type radio signals, M-1 first-type radio signals are first-type radio signals in the M first-type radio signals other than the target radio signal. The M first-type radio signals occupy same time domain resources in time domain, and occupy partially overlapping frequency domain resources in frequency domain. The second-type radio signal and the M first-type radio signals occupy partially overlapping time domain resources in time domain, the second-type radio signal and any of the M first-type radio signals occupy partially overlapping frequency domain resources in frequency domain.

In FIG. 9, a square filled by left slashes and having a fine-line border represents an RE occupied by the target radio signal but not by the M-1 first-type radio signals; a square filled by right slashes and having a fine-line border represents an RE occupied by the M-1 first-type radio signals but not by the target radio signal; a square filled by cross lines and having a fine-line border represents an RE occupied by both the M first-type radio signals; a white square having a heavy-line border represents an RE occupied by the second-type radio signal but not by the M first-type radio signals; and a square filled by right slashes and having a heavy-line border represents an RE occupied by both the second-type radio signal and the M-1 first-type radio signals.

In one embodiment, time domain resources occupied by the second-type radio signal in time domain is within time domain resources occupied by the M first-type radio signals in time domain.

In one embodiment, there is no RE that is occupied by both the target radio signal and the second-type radio signal.

In one embodiment, at least one RE is occupied by both the M-1 first-type radio signals and the second-type radio signal.

In one embodiment, the RE refers to Resource Element.

In one embodiment, the RE occupies a duration of one multicarrier symbol in time domain, and occupies a bandwidth of one subcarrier in frequency domain.

In one subembodiment, the multicarrier symbol is an OFDM symbol.

In one subembodiment, the multicarrier symbol is a DFT-S-OFDM symbol.

In one subembodiment, the multicarrier symbol is an FBMC symbol.

In one embodiment, the M first-type radio signals occupy 1 slot in time domain.

In one embodiment, the M first-type radio signals occupy 1 subframe in time domain.

In one embodiment, the M first-type radio signals occupy 1 ms in time domain.

In one embodiment, the M first-type radio signals occupy multiple consecutive slots in time domain.

In one embodiment, the M first-type radio signals occupy multiple consecutive subframes in time domain.

In one embodiment, the M first-type radio signals occupy a positive integer number of consecutive multicarrier symbols in time domain.

In one embodiment, the M first-type radio signals occupy multiple inconsecutive slots in time domain.

In one embodiment, the M first-type radio signals occupy multiple inconsecutive subframes in time domain.

In one embodiment, the M first-type radio signals occupy a positive integer number of inconsecutive multicarrier symbols in time domain.

In one embodiment, the target radio signal occupy a positive integer number of consecutive subcarriers in frequency domain.

In one embodiment, the M-1 first-type radio signals occupy a positive integer number of consecutive subcarriers in frequency domain.

Embodiment 10

Figure 10:
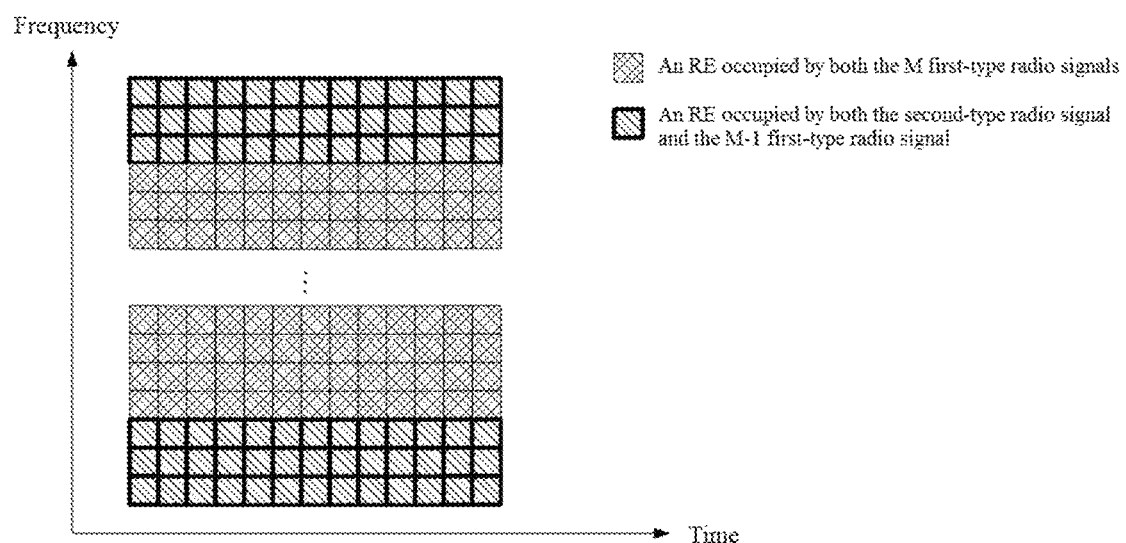
FIG. 10 is a diagram illustrating resource mapping of M first-type radio signals and a second-type radio signal in time-frequency domain according to another embodiment of the present disclosure.

Embodiment 10 illustrates an example of a diagram of resource mapping of M first-type radio signals and a second-type radio signal in time-frequency domain, as shown in FIG. 10.

In Embodiment 10, the M is equal to 2, the M first-type radio signals are transmitted by M antenna port groups respectively, and the second-type radio signal is transmitted by an antenna port group corresponding to a target radio signal; the target radio signal is one of the M first-type radio signals, M-1 first-type radio signals are first-type radio signals in the M first-type radio signals other than the target radio signal. The M first-type radio signals occupy same time domain resources in time domain, and occupy same frequency domain resources in frequency domain. The second-type radio signal and the M first-type radio signals occupy same time domain resources in time domain, the second-type radio signal and the target radio signal occupy mutually orthogonal (non-overlapping) frequency domain resources in frequency domain, the second-type radio signal and the M-1 first-type radio signals occupy partially overlapping frequency domain resources in frequency domain.

In FIG. 10, a square filled by cross lines and having a fine-line border represents an RE occupied by both the M first-type radio signals, and a square filled by right slashes and having a heavy-line border represents an RE occupied by both the second-type radio signal and the M-1 first-type radio signals.

In one embodiment, the target radio signal occupies a positive integer number of inconsecutive subcarriers in frequency domain.

In one embodiment, the M-1 first-type radio signals occupy a positive integer number of inconsecutive subcarriers in frequency domain.

Embodiment 11

Figure 11:
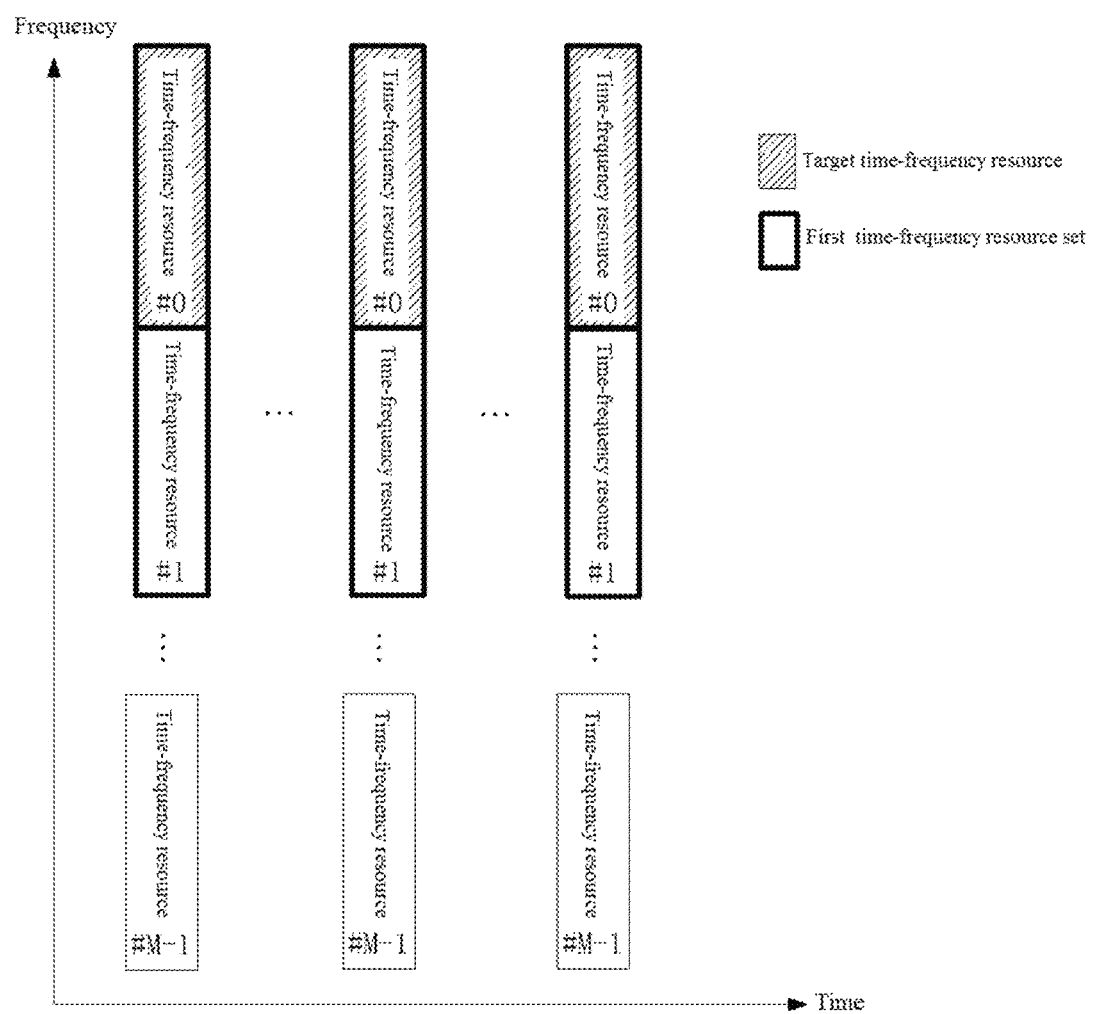
FIG. 11 is a diagram illustrating distribution of M time-frequency resources, a first time-frequency resource set and a target time-frequency resource in time-frequency domain according to one embodiment of the present disclosure.

Embodiment 11 illustrates an example of a diagram of distribution of M time-frequency resources, a first time-frequency resource set and a target time-frequency resource in time-frequency domain, as shown in FIG. 11.

In Embodiment 11, the M time-frequency resources occupy same time domain resources in time domain, and occupy mutually orthogonal frequency domain resources in frequency domain. A target time-frequency resource is one of the M time-frequency resources that is corresponding to the target radio signal in the present disclosure, and the target time-frequency resource belongs to a first time-frequency resource set. Any of the M time-frequency resources and the first time-frequency resource set include a positive integer number of REs respectively.

In FIG. 11, a rectangle having a heavy-line border represents the first time-frequency resource set, and a rectangle filled by left slashes represents the target time-frequency resource; and indexes of the M time-frequency resources are {#0, #1, . . . , #M-1} respectively.

In one embodiment, the RE refers to Resource Element.

In one embodiment, the RE occupies a duration of one multicarrier symbol in time domain, and occupies a bandwidth of one subcarrier in frequency domain.

In one subembodiment, the multicarrier symbol is an OFDM symbol.

In one subembodiment, the multicarrier symbol is a DFT-S-OFDM symbol.

In one subembodiment, the multicarrier symbol is an FBMC symbol.

In one embodiment, the M time-frequency resources are M CORESETs respectively.

In one embodiment, the first time-frequency resource set includes a positive integer number of CORESETs.

In one embodiment, the M time-frequency resources are M search spaces respectively.

In one embodiment, the first time-frequency resource set includes a positive integer number of search spaces.

In one embodiment, the M time-frequency resources appear multiple times in time domain respectively.

In one embodiment, a time interval between any two adjacent appearances of any of the M time-frequency resources in time domain is equal.

In one embodiment, time intervals between two adjacent appearances of any two of the M time-frequency resources in time domain are equal.

In one embodiment, time intervals between two adjacent appearances of any two of the M time-frequency resources in time domain are not equal.

In one embodiment, at least two of the M time-frequency resources have equal time intervals between two adjacent appearances in time domain.

In one embodiment, at least two of the M time-frequency resources have unequal time intervals between two adjacent appearances thereof in time domain.

In one embodiment, antenna ports in a reference antenna port set are used to transmit radio signals on the first time-frequency resource set, and the reference antenna port set includes a positive integer number of antenna ports.

In one subembodiment, any antenna port in the reference antenna port set is QCLed with one antenna port in the first antenna port group in the present disclosure.

In one subembodiment, any antenna port in the reference antenna port set is QCLed with any antenna port in the first antenna port group in the present disclosure.

In one subembodiment, any two antenna ports in the reference antenna port set are QCLed.

In one embodiment, antenna ports transmitting any two radio signals transmitted on the first time-frequency resource set are QCLed.

In one embodiment, any of the M time-frequency resources includes a positive integer number of inconsecutive multicarrier symbols in time domain.

In one embodiment, any of the M time-frequency resources includes a positive integer number of consecutive subcarriers in frequency domain.

In one embodiment, any of the M time-frequency resources includes a positive integer number of inconsecutive subcarriers in frequency domain.

In one embodiment, at least one of the M time-frequency resources includes a positive integer number of inconsecutive subcarriers in frequency domain.

In one embodiment, at least one of the M time-frequency resources includes a positive integer number of consecutive subcarriers in frequency domain.

Embodiment 12

Figure 12:
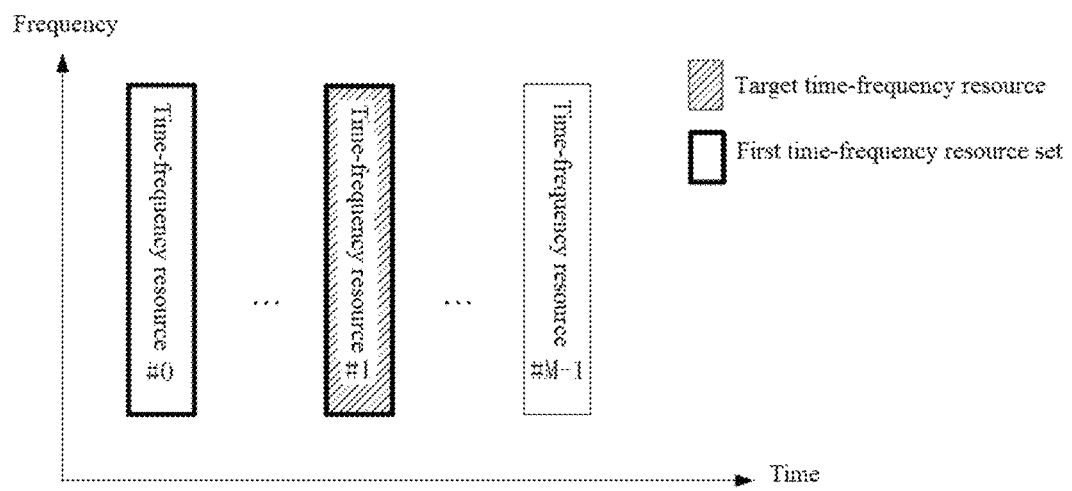
FIG. 12 is a diagram illustrating distribution of M time-frequency resources, a first time-frequency resource set and a target time-frequency resource in time-frequency domain according to another embodiment of the present disclosure.

Embodiment 12 illustrates an example of a diagram of distribution of M time-frequency resources, a first time-frequency resource set and a target time-frequency resource in time-frequency domain, as shown in FIG. 12.

In Embodiment 12, the M time-frequency resources occupy mutually orthogonal time domain resources in time domain, and occupy same frequency domain resources in frequency domain. A target time-frequency resource is one of the M time-frequency resources that is corresponding to the target radio signal in the present disclosure, and the target time-frequency resource belongs to a first time-frequency resource set. Any one of the M time-frequency resources and the first time-frequency resource set include a positive integer number of REs respectively.

In FIG. 12, a rectangle having a heavy-line border represents the first time-frequency resource set, and a rectangle filled by left slashes represents the target time-frequency resource; and indexes of the M time-frequency resources are {#0, #1, . . . , #M-1} respectively.

In one embodiment, any of the M time-frequency resources appears only once in time domain.

Embodiment 13

Figure 13:
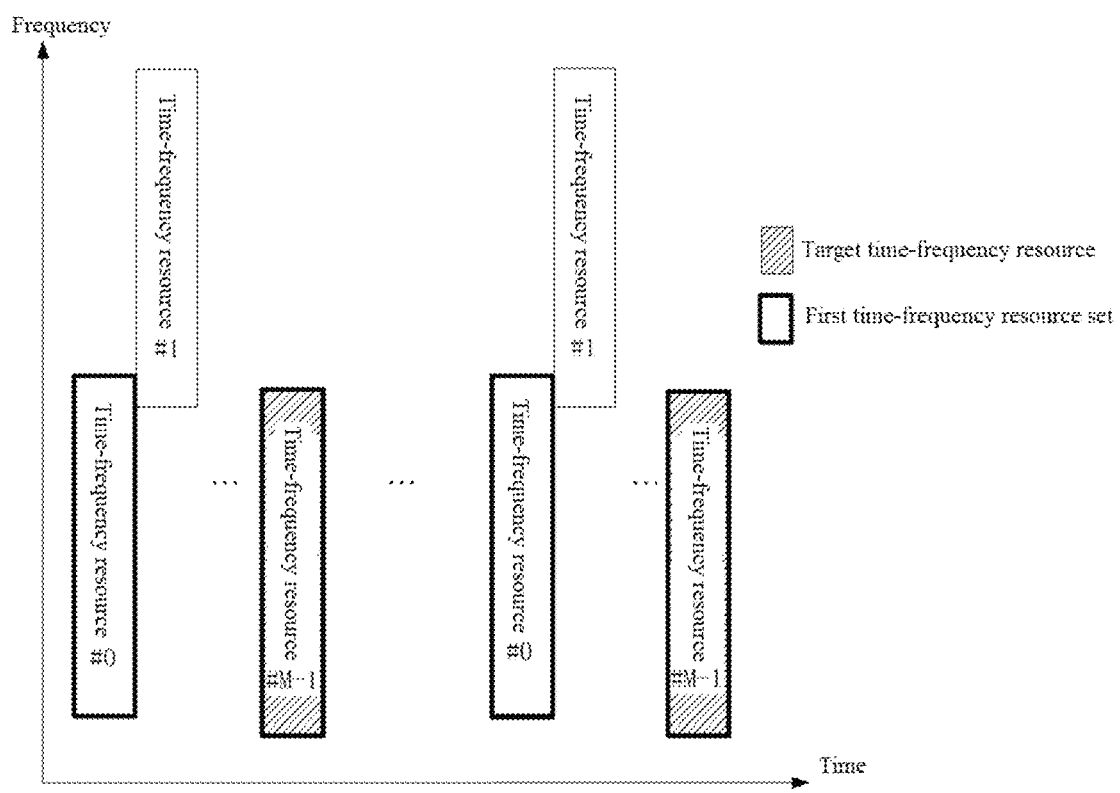
FIG. 13 is a diagram illustrating distribution of M time-frequency resources, a first time-frequency resource set and a target time-frequency resource in time-frequency domain according to a yet another embodiment of the present disclosure.

Embodiment 13 illustrates an example of a diagram of distribution of M time-frequency resources, a first time-frequency resource set and a target time-frequency resource in time-frequency domain, as shown in FIG. 13.

In Embodiment 13, any two of the M time-frequency resources occupy mutually orthogonal time domain resources in time domain, and occupy mutually orthogonal or partially overlapping frequency domain resources in frequency domain. A target time-frequency resource is one of the M time-frequency resources that is corresponding to the target radio signal in the present disclosure, and the target time-frequency resource belongs to a first time-frequency resource set. Any one of the M time-frequency resources and the first time-frequency resource set include a positive integer number of REs respectively.

In FIG. 13, a rectangle having a heavy-line border represents the first time-frequency resource set, and a rectangle filled by left slashes represents the target time-frequency resource; and indexes of the M time-frequency resources are {#0, #1, . . . , #M-1} respectively.

In one embodiment, any of the M time-frequency resources appear multiple times in time domain. At least two of the M time-frequency resources have unequal time intervals between two adjacent appearances in time domain.

Embodiment 14

Figure 14:
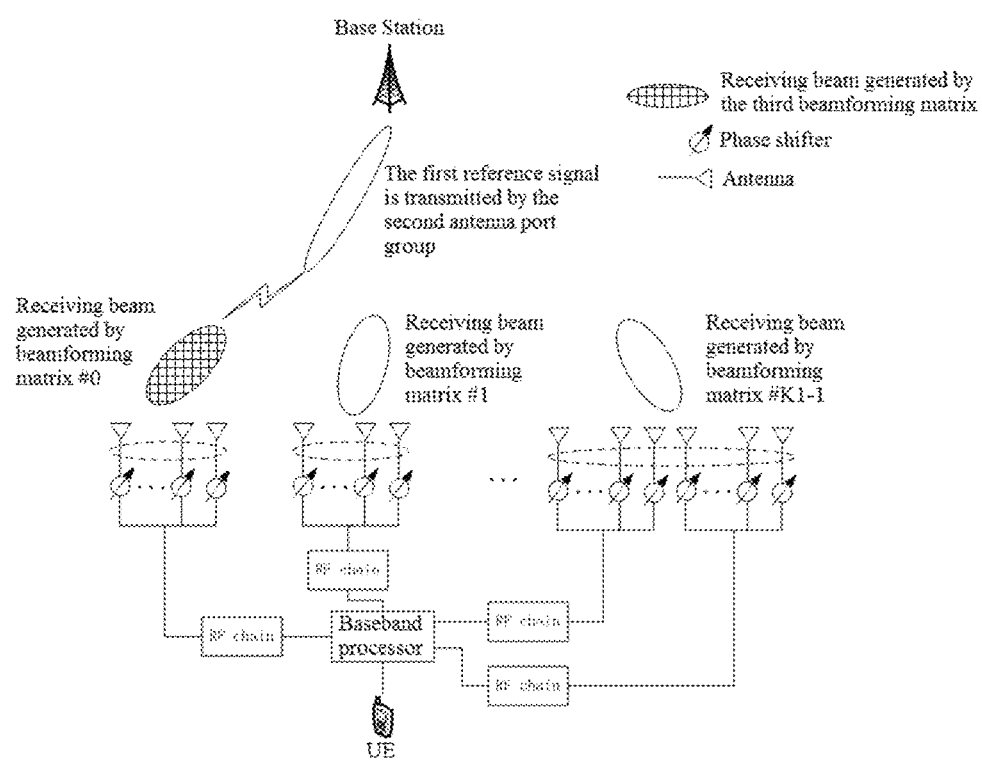
FIG. 14 is a diagram illustrating a relationship between a target antenna port group and a first antenna port group according to one embodiment of the present disclosure.

Embodiment 14 illustrates an example of a diagram of a relationship between a target antenna port group and a first antenna port group, as shown in FIG. 14.

In Embodiment 14, {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups. The base station in the present disclosure transmits a first reference signal, the first reference signal is transmitted by the second antenna port group, and a measurement targeting the first reference signal is used by the UE in the present disclosure to determine the third antenna port group.

As shown in FIG. 14, the UE receives the first reference signal using a receiving beam generated by each of K1 beamforming matrixes respectively. An analog beamforming matrix corresponding to the third antenna port group is a third beamforming matrix, and the third beamforming matrix is one of the K1 beamforming matrixes. In FIG. 14, indexes of the K1 beamforming matrixes are {#0, #1, . . . , #K1-1} respectively. The K1 is a positive integer greater than 1.

In one embodiment, the first antenna port group pair is a BPL.

In one embodiment, the first antenna port group pair consists of the second antenna port group and the third antenna port group.

In one embodiment, the first reference signal includes one or more of {SS, MIB/SIB, CSI-RS}.

In one embodiment, a receiving beam generated by a given beamforming matrix refers that: the given beamforming matrix is used as an analog beamforming matrix, and a vector obtained by multiplying the given beamforming matrix with a digital beamforming vector is used as a receiving beamforming vector to obtain the receiving beam.

In one embodiment, a reception quality obtained when the UE receives the first reference signal using a receiving beam generated by the third beamforming matrix is greater than a reception quality obtained when the UE receives the first reference signal using a receiving beam generated by any of the K1 beamforming matrix that is not equal to the third beamforming matrix.

In one subembodiment, the reception quality is an RSRP.

In one subembodiment, the reception quality is an RSRQ.

In one subembodiment, the reception quality is a CQI.

In one embodiment, the UE receives the first reference signal using receiving beams generated by the K1 beamforming matrixes on K1 mutually orthogonal time domain resources respectively.

In one embodiment, the first reference signal is wideband.

In one embodiment, a system bandwidth is divided into a positive integer number of frequency-domain parts, the first reference signal appears on each of the positive integer number of frequency-domain parts, and any of the positive integer number of frequency-domain parts includes a positive integer number of continuous subcarriers.

In one subembodiment, any two of the positive integer number of frequency-domain parts include a same number of subcarriers.

In one embodiment, the first reference signal is narrowband.

In one embodiment, a system bandwidth is divided into a positive integer number of frequency-domain parts, the first reference signal appears on a part of the positive integer number of frequency-domain parts only, and any of the positive integer number of frequency-domain parts includes a positive integer number of continuous subcarriers.

In one subembodiment, any two of the positive integer number of frequency-domain parts include a same number of subcarriers.

In one embodiment, the first reference signal occupies multiple multicarrier symbols in time domain.

In one embodiment, the first reference signal appears only once in time domain.

In one embodiment, the first reference signal appears multiple times in time domain.

In one embodiment, a time interval between any two adjacent appearances of the first reference signal in time domain is equal.

In one embodiment, the first reference signal is aperiodic.

In one embodiment, the first reference signal is periodic.

In one embodiment, the first reference signal is semi-persistent.

In one embodiment, the QCLed refers to Quasi CO-Located.

In one embodiment, two antenna port groups being QCLed refers that: any antenna port in one of the two antenna port groups is QCLed with at least one antenna port in another of the two antenna port groups.

In one embodiment, two antenna port groups being QCLed refers that: any antenna port in one of the two antenna port groups is QCLed with any antenna port in another of the two antenna port groups.

In one embodiment, two antenna ports are said to be QCLed if large-scale properties of a channel over which a symbol on one of the two antenna ports is conveyed can be inferred from a channel over which a symbol on another of the two antenna ports is conveyed. The large-scale properties include one or more of {delay spread, Doppler spread, Doppler shift, average gain, average delay, angle of arrival, angle of departure, spatial correlation}.

In one embodiment, two antenna ports being QCLed refers that: the two antenna ports correspond to a same analog beamforming matrix.

In one embodiment, two antenna ports being QCLed refers that: the two antenna ports correspond to a same beamforming matrix.

In one embodiment, two antenna ports being QCLed refers that: a target receiver for a radio signal transmitted from any of the two antenna ports may receive radio signals transmitted from the two antenna ports using a same beamforming vector.

In one embodiment, two antenna ports being QCLed refers that: a target receiver for a radio signal transmitted from any of the two antenna ports may receive radio signals transmitted from the two antenna ports using a same analog beamforming matrix.

In one embodiment, two antenna ports being QCLed refers that: a target receiver for a radio signal transmitted from any of the two antenna ports may receive radio signals transmitted from the two antenna ports using same spatial filtering.

Embodiment 15

Figure 15:
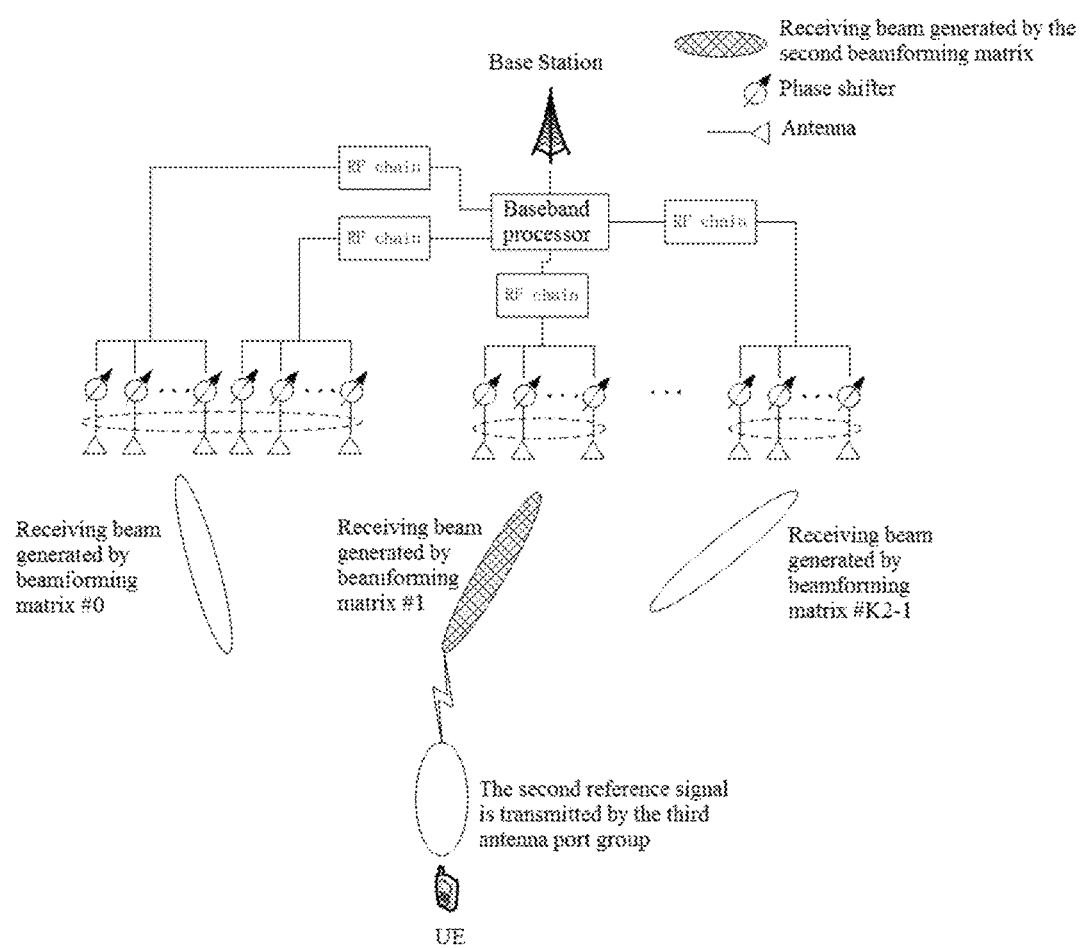
FIG. 15 is a diagram illustrating a relationship between a target antenna port group and a first antenna port group according to another embodiment of the present disclosure.

Embodiment 15 illustrates an example of a diagram of a relationship between a target antenna port group and a first antenna port group, as shown in FIG. 15.

In Embodiment 15, {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups. The UE in the present disclosure transmits a second reference signal, the second reference signal is transmitted by the third antenna port group, and a measurement targeting the second reference signal is used by the base station to determine the second antenna port group.

As shown in FIG. 15, the base station receives the second reference signal using a receiving beam generated by each of K2 beamforming matrixes respectively. An analog beamforming matrix corresponding to the second antenna port group is a second beamforming matrix, and the second beamforming matrix is one of the K2 beamforming matrixes. In FIG. 15, indexes of the K2 beamforming matrixes are {#0, #1, . . . , #K2-1} respectively. The K2 is a positive integer greater than 1.

In one embodiment, the second reference signal includes one or more of {RACH Preamble, SRS}.

In one embodiment, a reception quality obtained when the base station receives the second reference signal using a receiving beam generated by the second beamforming matrix is greater than a reception quality obtained when the base station receives the second reference signal using any of the K2 beamforming matrix that is not equal to the second beamforming matrix.

In one subembodiment, the reception quality is an RSRP.

In one subembodiment, the reception quality is an RSRQ.

In one subembodiment, the reception quality is a CQI.

In one embodiment, the base station receives the second reference signal using receiving beams generated by the K2 beamforming matrixes on K2 mutually orthogonal time domain resources respectively.

In one embodiment, the second reference signal is wideband.

In one embodiment, a system bandwidth is divided into a positive integer number of frequency-domain parts, the second reference signal appears on each of the positive integer number of frequency-domain parts, and any of the positive integer number of frequency-domain parts includes a positive integer number of continuous subcarriers.

In one subembodiment, any two of the positive integer number of frequency-domain parts include a same number of subcarriers.

In one embodiment, the second reference signal is narrowband.

In one embodiment, a system bandwidth is divided into a positive integer number of frequency-domain parts, the second reference signal appears on a part of the positive integer number of frequency-domain parts only, and any of the positive integer number of frequency-domain partsvincludes a positive integer number of continuous subcarriers.

In one subembodiment, any two of the positive integer number of frequency-domain parts include a same number of subcarriers.

In one embodiment, the second reference signal occupies multiple multicarrier symbols in time domain.

In one embodiment, the second reference signal appears only once in time domain.

In one embodiment, the second reference signal appears multiple times in time domain.

In one embodiment, a time interval between any two adjacent appearances of the second reference signal in time domain is equal.

In one embodiment, the second reference signal is aperiodic.

In one embodiment, the second reference signal is periodic.

In one embodiment, the second reference signal is semi-persistent.

Embodiment 16

Figure 16:
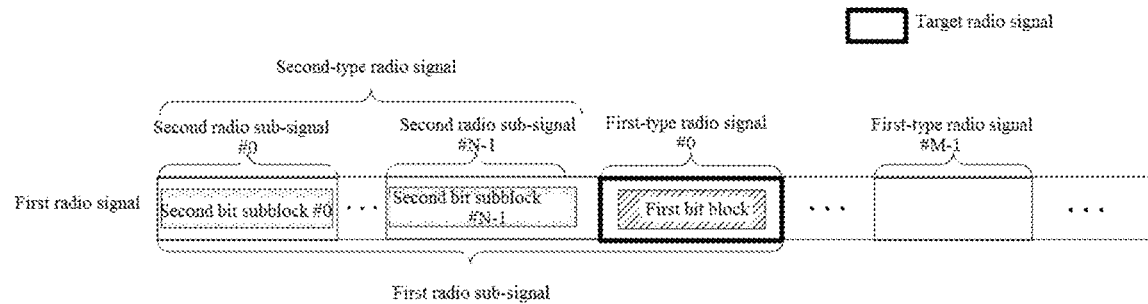
FIG. 16 is a diagram illustrating determination of a number of REs occupied by a second-type radio signal in time-frequency domain according to one embodiment of the present disclosure.

Embodiment 16 illustrates an example of a diagram of determination of a number of REs occupied by a second-type radio signal in time-frequency domain, as shown in FIG. 16.

In Embodiment 16, the first radio signal in the present disclosure includes M first-type radio signals and the second-type radio signal. The M first-type radio signals are transmitted by M antenna port groups respectively, the second-type radio signal is transmitted by a target antenna port group, and the target antenna port group is one of the M antenna port groups. The M first-type radio signals carry data respectively, and the second-type radio signal carries uplink control information. A target radio signal is one of the M first-type radio signals that is transmitted by the target antenna port group. A first radio sub-signal includes the target radio signal and the second-type radio signal. The second-type radio signal consists of N second radio sub-signals, N being a positive integer. The target radio signal carries a first bit block, and the target radio signal is a first transmission of the first bit block. The N second radio sub-signals carry N second bit sub-blocks respectively, {a number of REs occupied by the first radio sub-signal in time-frequency domain, a number of bits in the first bit block, a number of bits in a given second bit sub-block} are used for determining a number of REs occupied by a given second radio sub-signal in time-frequency domain; the given second radio sub-signal is any of the N second radio sub-signals, the given second bit sub-block is one of the N second bit sub-blocks that is carried by the given second radio sub-signal. The first bit block and the N second bit sub-blocks include a positive integer number of bits respectively.

In FIG. 16, indexes of the M first-type radio signals are {#0, #1, . . . , #M-1} respectively, indexes of the N second radio sub-signals are {#0, #1, . . . , #N-1} respectively, and indexes of the N second bit sub-blocks are {#0, #1, . . . , #N-1} respectively; the second radio sub-signal #i carries the second bit sub-block #i, wherein the i is a non-negative integer less than the N.

In one embodiment, the first radio sub-signal is the first radio signal.

In one embodiment, the first radio sub-signal consists of the target radio signal and the second-type radio signal.

In one embodiment, a given radio signal carrying a given bit block refers that: the given radio signal is an output after the given bit block experiences in turn channel coding, modulation mapper, layer mapper, precoding, resource element mapper, and multicarrier symbol generation.

In one embodiment, a given radio signal carrying a given bit block refers that: the given radio signal is an output after the given bit block experiences in turn channel coding, modulation mapper, layer mapper, transform precoder (which is used for generating complex-value signals), precoding, resource element mapper, and multicarrier symbol generation.

In one embodiment, a given radio signal carrying a given bit block refers that: the given radio signal is an output after the given bit block experiences in turn CRC attachment, code block segmentation, code block CRC attachment, channel coding, modulation mapper, layer mapper, precoding, resource element mapper, and multicarrier symbol generation.

In one embodiment, a given radio signal carrying a given bit block refers that: the given radio signal is an output after the given bit block experiences in turn CRC attachment, code block segmentation, code block CRC attachment, channel coding, modulation mapper, layer mapper, transform precoder (which is used for generating complex-value signals), precoding, resource element mapper, and multicarrier symbol generation.

In one embodiment, a given radio signal carrying a given bit block refers that: the given bit block is used for generating the given radio signal.

In one embodiment, the N is equal to 1.

In one embodiment, the N is greater than 1.

In one embodiment, the N second bit sub-blocks include UCIs respectively.

In one subembodiment, the UCI includes at least one of {HARQ-ACK, CSI, RI, CQI, PMI, CRI}.

In one embodiment, the RE refers to Resource Element.

In one embodiment, the RE occupies a duration of one multicarrier symbol in time domain, and occupies a bandwidth of one subcarrier in frequency domain.

In one subembodiment, the multicarrier symbol is an OFDM symbol.

In one subembodiment, the multicarrier symbol is a DFT-S-OFDM symbol.

In one subembodiment, the multicarrier symbol is an FBMC symbol.

In one embodiment, the first bit block includes a first information bit block and a first parity check bit block, and the first parity check bit block is a CRC bit block of the first information bit block.

In one embodiment, a CRC bit block of a given bit block refers to an output after the given bit block experiences a CRC cyclic generator polynomial. Refer to Section 5.1.1 in TS36.212 for specific technical details for generating the CRC bit block.

In one subembodiment, a polynomial formed by the given bit block and the CRC bit block of the given bit block is divisible by the CRC cyclic generator polynomial on GF(2), that is, a remainder obtained when the polynomial formed by the given bit block and the CRC bit block of the given bit block is divided by the CRC cyclic generator polynomial is zero.

In one embodiment, a number of REs occupied by the second radio sub-signal #j in time-frequency domain is calculated from the following formula, wherein the j is a non-negative integer less than the N.

$$Q' = \min\left(\left\lceil \frac{O \cdot M_{sc}^{PUSCH\_inital} \cdot N_{symb}^{PUSCH\_initial} \cdot \beta_{offset}^{PUSCH}}{\sum_{r=0}^{C-1} K_r} \right\rceil, 4 \cdot M_{sc}^{PUSCH}\right)$$

where the Q', the O, the $\beta_{offset}^{PUSCH}$, the $M_{sc}^{PUSCH\_initial}$, $N_{symb}^{PUSCH\_initial}$ and the $$\sum_{r=0}^{C-1} K_r$$

represent the number of REs occupied by the second radio sub-signal #j in time-frequency domain, a number of bits in the second bit sub-block #j, an offset between a number of REs occupied by each bit in the second bit sub-block #j and a number of REs occupied by each bit in the first bit block, the number of REs occupied by the first radio sub-signal in time-frequency domain, and the number of bits in the first bit block, respectively. The $N_{symb}^{PUSCH\_initial}$, the $M_{sc}^{PUSCH\_initial}$, the $M_{sc}^{PUSCH}$, the C, and the $K_r$ represent a number of multicarrier symbols occupied by a radio signal corresponding to a first transmission of the first bit block in time domain, a number of subcarriers occupied by a radio signal corresponding to the first transmission of the first bit block in frequency domain, a number of subcarriers occupied by the first radio sub-signal in frequency domain, a number of code blocks contained in the first bit block, and a number of bits in the rth code block contained in the first bit block, respectively. In the present embodiment, the target radio signal is the first transmission of the first bit block, the $N_{symb}^{PUSCH\_initial}$ and the $M_{sc}^{PUSCH\_initial}$ represent a number of multicarrier symbols occupied by the first radio sub-signal in time domain and a number of subcarriers occupied by the first radio sub-signal in frequency domain respectively. Refer to TS36.213 and TS36.212 for specific definitions of the Q', the O, the $M_{sc}^{PUSCH-initial}$, the $H_{symb}^{PUSCH-initial}$, the C, the $K_r$, the $\beta_{offset}^{PUSCH}$ and the $M_{sc}^{PUSCH}$.

In one subembodiment, the second bit sub-block #j includes an information bit block only, that is, including no parity check bit block.

In one reference embodiment of the above subembodiment, the parity check bit block is a CRC bit block of the information bit block.

In one subembodiment, the second bit sub-block #j includes an information bit block and a parity check bit block, and the parity check bit block is a CRC bit block of the information bit block.

In one subembodiment, the second bit sub-block #j includes at least one of {HARQ-ACK, RI, CRI}.

In one embodiment, the first bit block includes a third bit block and a fourth bit block; the first radio sub-signal includes a third sub-signal and a fourth sub-signal, the third sub-signal carries the third bit block, and the fourth sub-signal carries the fourth bit block. A number of REs occupied by the second radio sub-signal #j in time-frequency domain is calculated from the following formula, wherein the j is a non-negative integer less than the N.

$$Q' = \max\left\lbrace\min\left\lceil \frac{\left(O \cdot M_{sc}^{PUSCH(1)\_inital} \cdot N_{symb}^{PUSCH(1)\_inital} \cdot M_{sc}^{PUSCH(2)\_initial} \cdot N_{symb}^{PUSCH(2)\_initial} \cdot \beta_{offset}^{PUSCH}\right)}{\sum_{r=0}^{C^{(1)}-1} K_r^{(1)} \cdot M_{sc}^{PUSCH(2)\_initial} \cdot N_{symb}^{PUSCH(2)\_initial} + \sum_{r=0}^{C^{(2)}-1} K_r^{(2)} \cdot M_{sc}^{PUSCH(1)\_initial} \cdot N_{symb}^{PUSCH(1)\_initial}} \right\rceil, 4 \cdot M_{sc}^{PUSCH}\right\rbrace, Q'_1$$

where the Q', the O, the $\beta_{offset}^{PUSCH}$, the $M_{sc}^{PUSCH(1)\_initial} \cdot N_{symb}^{PUSCH(1)\_initial}$, the $$\sum_{r=0}^{C^{(1)}-1} K_r^{(1)},$$

the $M_{sc}^{PUSCH(2)\_initial} \cdot N_{symb}^{PUSCH(2)\_initial}$ and the $$\sum_{r=0}^{C^{(2)}-1} K_r^{(2)}$$

represent the number of REs occupied by the second radio sub-signal #j in time-frequency domain, a number of bits in the second bit sub-block #j, an offset between a number of REs occupied by each bit in the second bit sub-block #j and a number of REs occupied by each bit in the first bit block, a number of REs occupied by the third sub-signal in time-frequency domain, a number of bits in the third bit block, a number of REs occupied by the fourth sub-signal in time-frequency domain, and a number of bits in the fourth bit block, respectively. The $M_{sc}^{PUSCH(1)\_initial}$, the $N_{symb}^{PUSCH(1)\_initial}$, the $M_{sc}^{PUSCH(2)\_initial}$, the $N_{symb}^{PUSCH(2)\_initial}$, the $C^{(1)}$, the $K_r^{(1)}$, the $C^{(2)}$, the $K_r^{(2)}$, the $M_{sc}^{PUSCH}$ and the $Q'_{min}$ represent a number of subcarriers occupied by a radio signal corresponding to a first transmission of the third bit block in frequency domain, a number of multicarrier symbols occupied by a radio signal corresponding to the first transmission of the third bit block in time domain, a number of subcarriers occupied by a radio signal corresponding to a first transmission of the fourth bit block in frequency domain, a number of multicarrier symbols occupied by a radio signal corresponding to the first transmission of the fourth bit block in time domain, a number of code blocks contained in the third bit block, and a number of bits in the rth code block contained in the third bit block, a number of code blocks contained in the fourth bit block, and a number of bits in the rth code block contained in the fourth bit block, a number of subcarriers occupied by the first radio sub-signal in frequency domain, a minimum number of REs occupied by the second radio sub-signal #j in time-frequency domain, respectively. In the present embodiment, the target radio signal is a first transmission of the first bit block, the $M_{sc}^{PUSCH(1)\_initial}$, the $N_{symb}^{PUSCH(1)\_initial}$, the $M_{sc}^{PUSCH(1)\_initial}$, and the $N_{symb}^{PUSCH(2)\_initial}$ represents a number of multicarrier symbols occupied by the third sub-signal in time domain, a number of subcarriers occupied by the third sub-signal in frequency domain, a number of multicarrier symbols occupied by the fourth sub-signal in time domain, and a number of subcarriers occupied by the fourth sub-signal in frequency domain. Refer to TS36.213 and TS36.212 for specific definitions of the Q', the O, the $M_{sc\_hu\_PUSCH-initial(1)}$, the $N_{symb}^{PUSCH-initial(1)}$, the $M_{sc}^{PUSCH-initial(2)}$, the $N_{symb}^{PUSCH-initial(2)}$, the $C^{(1)}$, the $K_r^{(1)}$, the $C^{(2)}$, the $K_r^{(2)}$, the $M_{sc}^{PUSCH}$ and the $Q'_{min}$.

In one subembodiment, the second bit sub-block #j includes an information bit block only, that is, including no parity check bit block.

In one reference embodiment of the above subembodiment, the parity check bit block is a CRC bit block of the information bit block.

In one subembodiment, the second bit sub-block #j includes an information bit block and a parity check bit block, and the parity check bit block is a CRC bit block of the information bit block.

In one subembodiment, the second bit sub-block #j includes at least one of {HARQ-ACK, RI, CRI}.

In one subembodiment, the third bit block includes a third information bit block and a third parity check bit block, and the third parity check bit block is a CRC bit block of the third information bit block.

In one subembodiment, the fourth bit block includes a fourth information bit block and a fourth parity check bit block, and the fourth parity check bit block is a CRC bit block of the fourth information bit block.

In one subembodiment, the third bit block and the fourth bit block include bits in two different Transport Blocks (TBs) respectively.

In one embodiment, the second bit sub-block #j includes a second information bit sub-block and a second parity check bit sub-block, and the second parity check bit sub-block is a CRC bit block of the second information bit sub-block. A number of REs occupied by the second radio sub-signal #j in time-frequency domain is calculated from the following formula, wherein the j is a non-negative integer less than the N.

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right)$$

where the Q', the O+L, the $\beta_{offset}^{PUSCH}$, the $M_{sc}^{PUSCH-initial(x)} \cdot N_{symb}^{PUSCH-initial(x)}$ and the $$\sum_{r=0}^{C^{(x)}-1} K_r^{(x)}$$

represent the number of REs occupied by the second radio sub-signal #j in time-frequency domain, a number of bits in the second bit sub-block #j, an offset between a number of REs occupied by each bit in the second bit sub-block #j and a number of REs occupied by each bit in the first bit block, the number of REs occupied by the first radio sub-signal in time-frequency domain, and the number of bits in the first bit block, respectively. The O, the L, the $M_{sc}^{PUSCH-initial(x)}$, the $N_{symb}^{PUSCH-initial(x)}$, the $C^{(x)}$, the $K_r^{(x)}$, the $M_{sc}^{PUSCH}$, the $N_{symb}^{PUSCH}$, the $Q_{RI}^{(x)}$ and the $Q_m^{(x)}$ represent a number of bits in the second information bit sub-block, a number of bits in the second parity check bit sub-block, a number of subcarriers occupied by a radio signal corresponding to a first transmission of the first bit block in frequency domain, a number of multicarrier symbols occupied by a radio signal corresponding to the first transmission of the first bit block in time domain, a number of code blocks contained in the first bit block, and a number of bits in the rth code block contained in the first bit block, a quantity related to a number of RI/CRI bits carried in the N second radio sub-signals, and a quantity related to a modulation order of the first radio sub-signal, respectively. In the present embodiment, the target radio signal is the first transmission of the first bit block, the $M_{sc}^{PUSCH-initial(x)}$ and the $N_{symb}^{PUSCH-inital(x)}$ represent a number of multicarrier symbols occupied by the first radio sub-signal in time domain and a number of subcarriers occupied by the first radio sub-signal in frequency domain respectively. Refer to TS36.213 and TS36.212 for specific definitions of the O, the L, the $M_{sc}^{PUSCH-initial(x)}$, the $N_{symb}^{PUSCH-initial(x)}$, the $C^{(x)}$, the $K_r^{(x)}$, the $M_{sc}^{PUSCH}$, the $N_{symb}^{PUSCH}$, the $Q_{RI}^{(x)}$ and the $Q_m^{(x)}$.

In one subembodiment, the second bit sub-block #j includes at least one of {CQI, PMI}.

Embodiment 17

Figure 17:
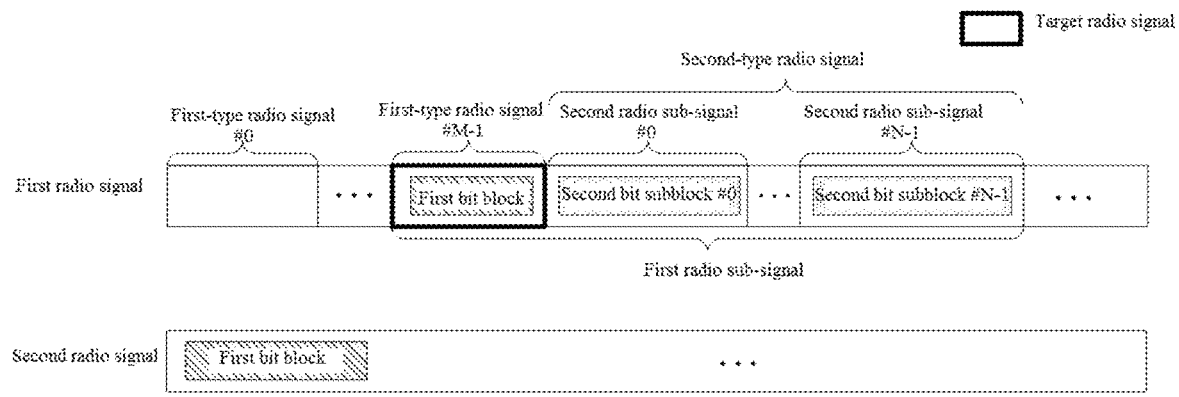
FIG. 17 is a diagram illustrating determination of a number of REs occupied by a second-type radio signal in time-frequency domain according to another embodiment of the present disclosure.

Embodiment 17 illustrates an example of a diagram of determination of a number of REs occupied by a second-type radio signal in time-frequency domain, as shown in FIG. 17.

In Embodiment 17, the first radio signal in the present disclosure includes M first-type radio signals and the second-type radio signal. The M first-type radio signals are transmitted by M antenna port groups respectively, the second-type radio signal is transmitted by a target antenna port group, and the target antenna port group is one of the M antenna port groups. The M first-type radio signals carry data respectively, and the second-type radio signal carries uplink control information. A target radio signal is one of the M first-type radio signals that is transmitted by the target antenna port group. A first radio sub-signal includes the target radio signal and the second-type radio signal. The second-type radio signal consists of N second radio sub-signals, N being a positive integer. Both the target radio signal and a second radio signal carry a first bit block, the second radio signal is a first transmission of the first bit block, and the target radio signal is a retransmission of the first bit block. The N second radio sub-signals carry N second bit sub-blocks respectively, {a number of REs occupied by the second radio signal in time-frequency domain, a number of bits in the first bit block, a number of bits in a given second bit sub-block} are used for determining a number of REs occupied by a given second radio sub-signal in time-frequency domain; the given second radio sub-signal is any of the N second radio sub-signals, the given second bit sub-block is one of the N second bit sub-blocks that is carried by the given second radio sub-signal. The first bit block and the N second bit sub-blocks include a positive integer number of bits respectively.

In FIG. 17, indexes of the M first-type radio signals are {#0, #1, . . . , #M-1} respectively, indexes of the N second radio sub-signals are {#0, #1, . . . , #N-1} respectively, and indexes of the N second bit sub-blocks are {#0, #1, . . . , #N-1} respectively; the second radio sub-signal #i carries the second bit sub-block #i, wherein the i is a non-negative integer less than the N.

In one embodiment, time domain resources occupied by the second radio signal are before time domain resources occupied by the first radio signal.

In one embodiment, the second radio signal includes at least the former one of {uplink data, uplink control information}.

In one embodiment, an RV corresponding to the second radio signal is different from an RV corresponding to the target radio signal.

In one embodiment, an NDI corresponding to the second radio signal is same as an NDI corresponding to the target radio signal.

In one embodiment, the second radio signal and the target radio signal correspond to a same HARQ process number.

In one embodiment, a number of REs occupied by the second radio sub-signal #j in time-frequency domain is calculated from the following formula, wherein the j is a non-negative integer less than the N.

$$Q' = \min\left(\left\lceil \frac{O \cdot M_{sc}^{PUSCH\_inital} \cdot N_{symb}^{PUSCH\_initial} \cdot \beta_{offset}^{PUSCH}}{\sum_{r=0}^{C-1} K_r} \right\rceil, 4 \cdot M_{sc}^{PUSCH}\right)$$

where the Q', the O, the $\beta_{offset}^{PUSCH}$, the $M_{sc}^{PUSCH\_initial}$, $N_{symb}^{PUSCH\_initial}$, the $\sum_{r=0}^{C-1} K_r$ and the $M_{sc}^{PUSCH}$ represent the number of REs occupied by the second radio sub-signal #j in time-frequency domain, a number of bits in the second bit sub-block #j, an offset between a number of REs occupied by each bit in the second bit sub-block #j and a number of REs occupied by each bit in the first bit block, the number of REs occupied by the second radio signal in time-frequency domain, the number of bits in the first bit block, and a number of subcarriers occupied by the first radio sub-signal in frequency domain, respectively. The $N_{symb}^{PUSCH\_initial}$, the $M_{sc}^{PUSCH\_initial}$, the C, and the $K_r$ represent a number of multicarrier symbols occupied by the second radio signal in time domain, a number of subcarriers occupied by the second radio signal in frequency domain, a number of code blocks contained in the first bit block, and a number of bits in the rth code block contained in the first bit block, respectively. Refer to TS36.213 and TS36.212 for specific definitions of the Q', the O, the $M_{sc}^{PUSCH\text{-}initial}$, the $N_{symb}^{PUSCH\text{-}initial}$, the C, the $K_r$, the $\beta_{offset}^{PUSCH}$ and the $M_{sc}^{PUSCH}$.

In one subembodiment, the second bit sub-block #j includes an information bit block only, that is, including no parity check bit block.

In one reference embodiment of the above subembodiment, the parity check bit block is a CRC bit block of the information bit block.

In one subembodiment, the second bit sub-block #j includes an information bit block and a parity check bit block, and the parity check bit block is a CRC bit block of the information bit block.

In one subembodiment, the second bit sub-block #j includes at least one of {HARQ-ACK, RI, CRI}.

In one embodiment, the first bit block includes a third bit block and a fourth bit block; the second radio signal includes a third sub-signal and a fourth sub-signal, the third sub-signal carries the third bit block, and the fourth sub-signal carries the fourth bit block. A number of REs occupied by the second radio sub-signal #j in time-frequency domain is calculated from the following formula, wherein the j is a non-negative integer less than the N.

$$Q' = \max\left\{\min\left[\left\lceil \frac{\left(O \cdot M_{sc}^{PUSCH(1)\_initial} \cdot N_{symb}^{PUSCH(1)\_initial} \cdot M_{sc}^{PUSCH(2)\_initial} \cdot N_{symb}^{PUSCH(2)\_initial} \cdot \beta_{offset}^{PUSCH}\right)}{\sum_{r=0}^{C^{(1)}-1} K_r^{(1)} \cdot M_{sc}^{PUSCH(2)\_initial} \cdot N_{symb}^{PUSCH(2)\_initial} + \sum_{r=0}^{C^{(2)}-1} K_r^{(2)} \cdot M_{sc}^{PUSCH(1)\_initial} \cdot N_{symb}^{PUSCH(1)\_initial}} \right\rceil, 4 \cdot M_{sc}^{PUSCH}\right], Q_1'\right\}$$

where the Q', the O, the $\beta_{offset}^{PUSCH}$, the $M_{sc}^{PUSCH(1)\_initial} \cdot N_{symb}^{PUSCH(1)\_initial}$, the $$\sum_{r=0}^{C^{(1)}-1} K_r^{(1)},$$

the $M_{sc}^{PUSCH(2)\_initial} \cdot N_{symb}^{PUSCH(2)\_initial}$, the $$\sum_{r=0}^{C^{(2)}-1} K_r^{(2)}$$

and the $M_{sc}^{PUSCH}$ represent the number of REs occupied by the second radio sub-signal #j in time-frequency domain, a number of bits in the second bit sub-block #j, an offset between a number of REs occupied by each bit in the second bit sub-block #j and a number of REs occupied by each bit in the first bit block, a number of REs occupied by the third sub-signal in time-frequency domain, a number of bits in the third bit block, a number of REs occupied by the fourth sub-signal in time-frequency domain, a number of bits in the fourth bit block, and a number of subcarriers occupied by the first radio sub-signal in frequency domain, respectively. The $M_{sc}^{PUSCH(1)\_initial}$, the $N_{symb}^{PUSCH(1)\_initial}$, and $M_{sc}^{PUSCH(2)\_initial}$, the C(1), the $K_r^{(1)}$, the $C^{(2)}$, the $K_r^{(2)}$, and the $Q'_{min}$ represent a number of subcarriers occupied by the third sub-signal in frequency domain, a number of multicarrier symbols occupied by the third sub-signal in time domain, a number of subcarriers occupied by the fourth sub-signal in frequency domain, a number of multicarrier symbols occupied by the fourth sub-signal in time domain, a number of code blocks contained in the third bit block, and a number of bits in the rth code block contained in the third bit block, a number of code blocks contained in the fourth bit block, and a number of bits in the rth code block contained in the fourth bit block, and a minimum number of REs occupied by the second radio sub-signal #j in time-frequency domain, respectively. Refer to TS36.213 and TS36.212 for specific definitions of the Q', the O, the $M_{sc}^{PUSCH-initial(1)}$, the $N_{symb}^{PUSCH-initial(1)}$, the $M_{sc}^{PUSCH-initial(2)}$, the $N_{symb}^{PUSCH-initial(2)}$, the $C^{(1)}$, the $K_r^{(1)}$, the $C^{(2)}$, the $K_r^{(2)}$, the $M_{sc}^{PUSCH}$ and the $Q'_{min}$.

In one subembodiment, the second bit sub-block #j includes an information bit block only, that is, including no parity check bit block.

In one reference embodiment of the above subembodiment, the parity check bit block is a CRC bit block of the information bit block.

In one subembodiment, the second bit sub-block #j includes an information bit block and a parity check bit block, and the parity check bit block is a CRC bit block of the information bit block.

In one subembodiment, the second bit sub-block #j includes at least one of {HARQ-ACK, RI, CRI}.

In one subembodiment, the third bit block includes a third information bit block and a third parity check bit block, and the third parity check bit block is a CRC bit block of the third information bit block.

In one subembodiment, the fourth bit block includes a fourth information bit block and a fourth parity check bit block, and the fourth parity check bit block is a CRC bit block of the fourth information bit block.

In one subembodiment, the third bit block and the fourth bit block include bits in two different TBs respectively.

In one embodiment, the second bit sub-block #j includes a second information bit sub-block and a second parity check bit sub-block, and the second parity check bit sub-block is a CRC bit block of the second information bit sub-block. The first bit block includes a third bit block and a fourth bit block; the second radio signal includes a third sub-signal and a fourth sub-signal, the third sub-signal carries the third bit block, and the fourth sub-signal carries the fourth bit block. A reference sub-signal is one of the third sub-signal and the fourth sub-signal, and a reference bit block is a bit block carried by the reference sub-signal. A number of REs occupied by the second radio sub-signal #j in time-frequency domain is calculated from the following formula, wherein the j is a non-negative integer less than the N.

$$Q' = \min\left(\left\lceil \frac{(O+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, \right.$$

$$\left. M_{sc}^{PUSCH} \cdot N_{symb}^{PUSCH} - \frac{Q_{RI}^{(x)}}{Q_m^{(x)}}\right)$$

where the Q', the O+L the $\beta_{offset}^{PUSCH}$, the $M_{sc}^{PUSCH-initial(x)} \cdot N_{symb}^{PUSCH-initial(x)}$, the $$\sum_{r=0}^{C^{(x)}-1} K_r^{(x)}$$

and the $M_{sc}^{PUSCH} \cdot N_{symb}^{PUSCH}$ represent the number of REs occupied by the second radio sub-signal #j in time-frequency domain, a number of bits in the second bit sub-block #j, an offset between a number of REs occupied by each bit in the second bit sub-block #j and a number of REs occupied by each bit in the first bit block, a number of REs occupied by the reference sub-signal in time-frequency domain, a number of bits in the reference bit block, and a number of REs occupied by the first radio sub-signal in time-frequency domain, respectively. The O, the L, the $M_{sc}^{PUSCH-initial(x)}$, the $N_{symb}^{PUSCH-initial(x)}$, the $C^{(x)}$, the $K_r^{(x)}$, the $M_{sc}^{PUSCH}$, the $N_{symb}^{PUSCH}$, the $Q_{RI}^{(x)}$ and the $Q_m^{(x)}$ represents a number of bits in the second information bit sub-block, a number of bits in the second parity check bit sub-block, a number of subcarriers occupied by the reference sub-signal in frequency domain, a number of multicarrier symbols occupied by reference sub-signal in time domain, a number of code blocks contained in the reference bit block, a number of bits in the rth code block contained in the reference bit block, a number of subcarriers occupied by the first radio sub-signal in frequency domain, a number of multicarrier symbols occupied by the first radio sub-signal in time domain, a quantity related to a number of RI/CRI bits carried in the N second radio sub-signals, and a quantity related to a modulation order of the first radio sub-signal, respectively. Refer to TS36.213 and TS36.212 for specific definitions of the O, the L, the $M_{sc}^{PUSCH-initial(x)}$, the $N_{symb}^{PUSCH-initial(x)}$, the $C^{(x)}$, the $K_r^{(x)}$, the $M_{sc}^{PUSCH}$, the $N_{symb}^{PUSCH}$, the $Q^{RI}_{(x)}$ and the $Q_m^{(x)}$.

In one subembodiment, the second bit sub-block #j includes at least one of {CQI, PMI}.

Embodiment 18

Figure 18:
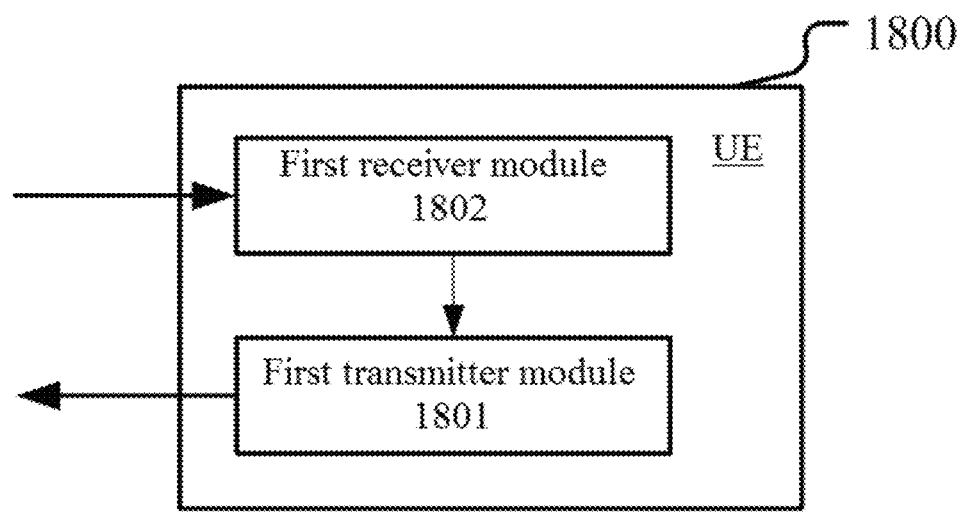
FIG. 18 is a structure block diagram illustrating a processing device in a UE according to one embodiment of the present disclosure.

Embodiment 18 illustrates an example of a structure block diagram of a processing device in a UE, as shown in FIG. 18. In FIG. 18, the processing device 1800 in the UE is mainly composed of a first transmitter module 1801 and a first receiver module 1802.

In Embodiment 18, the first transmitter module 1801 transmits a first radio signal, and the first receiver module 1802 receives first information.

In Embodiment 18, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used by the first transmitter module 1801 to determine the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for by the first receiver module 1802 in the M time-frequency resources respectively; and, the first information, wherein the first information indicates explicitly the target antenna port group from the M antenna port groups.

Herein, one antenna port group includes a positive integer number of antenna ports, and the M is a positive integer greater than 1.

In one embodiment, the first information is used by the first transmitter module 1801 to determine the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 MCS indexes respectively, and a MCS index corresponding to one of the M first-type radio signals is equal to a maximum value in the M1 MCS indexes.

In one embodiment, the first receiver module 1802 further receives a first signaling, wherein the first signaling includes scheduling information of the first radio signal.

In one embodiment, the first receiver module 1802 further receives the M downlink signalings on the M time-frequency resources respectively, wherein the M downlink signalings include scheduling information of the M first-type radio signals respectively.

In one subembodiment, the first receiver module 1802 further receives M4 downlink signalings on M4 time-frequency resources respectively, wherein the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M.

In one embodiment, a target time-frequency resource belongs to a first time-frequency resource set, the target time-frequency resource is one of the M time-frequency resources that is corresponding to a target radio signal, and the target radio signal is one of the M first-type radio signals that is transmitted by the target antenna port group.

In one subembodiment, the first receiver module 1802 further receives a first downlink signaling, wherein the first downlink signaling is used for determining the first time-frequency resource set.

In one embodiment, {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one subembodiment, the first receiver module 1802 further receives a first reference signal, wherein the first reference signal is transmitted by the second antenna port group, and a measurement targeting the first reference signal is used for determining the third antenna port group.

In one subembodiment, the first transmitter module 1801 further transmits a second reference signal, wherein the second reference signal is transmitted by the third antenna port group, and a measurement targeting the second reference signal is used for determining the second antenna port group.

In one embodiment, {a number of REs occupied by a first radio sub-signal in time-frequency domain, a number of bits contained in a first bit block, a number of bits contained in a second bit block} are used by the first transmitter module 1801 to determine a number of REs occupied by the second-type radio signal in time-frequency domain; the first radio sub-signal includes a target radio signal and the second-type radio signal, the target radio signal is one of the M first-type radio signals that is transmitted by the target antenna port group, the target radio signal carries the first bit block, and the second-type radio signal carries the second bit block.

In one embodiment, {a number of REs occupied by a second radio signal in time-frequency domain, a number of bits contained in a first bit block, a number of bits contained in a second bit block} are used by the first transmitter module 1801 to determine a number of REs occupied by the second-type radio signal in time-frequency domain; both the second radio signal and a target radio signal carry the first bit block, the second-type radio signal carries the second bit block, and the target radio signal is one of the M first-type radio signals that is transmitted by the target antenna port group; and the second radio signal is a first transmission of the first bit block, and the target radio signal is a retransmission of the first bit block.

In one subembodiment, the first transmitter module 1801 further transmits the second radio signal.

In one subembodiment, the first receiver module 1801 further receives a second signaling, wherein the second signaling includes scheduling information of the second radio signal.

In one embodiment, the first transmitter module 1801 includes at least one of {the antenna 452, the transmitter 454, the transmitting processor 468, the multi-antenna transmitting processor 457, the controller/processor 459, the memory 460, the data source 467} mentioned in Embodiment 4.

In one embodiment, the first receiver module 1802 includes at least one of {the antenna 452, the receiver 454, the receiving processor 456, the multi-antenna receiving processor 458, the controller/processor 459, the memory 460, the data source 467} mentioned in Embodiment 4.

Embodiment 19

Figure 19:
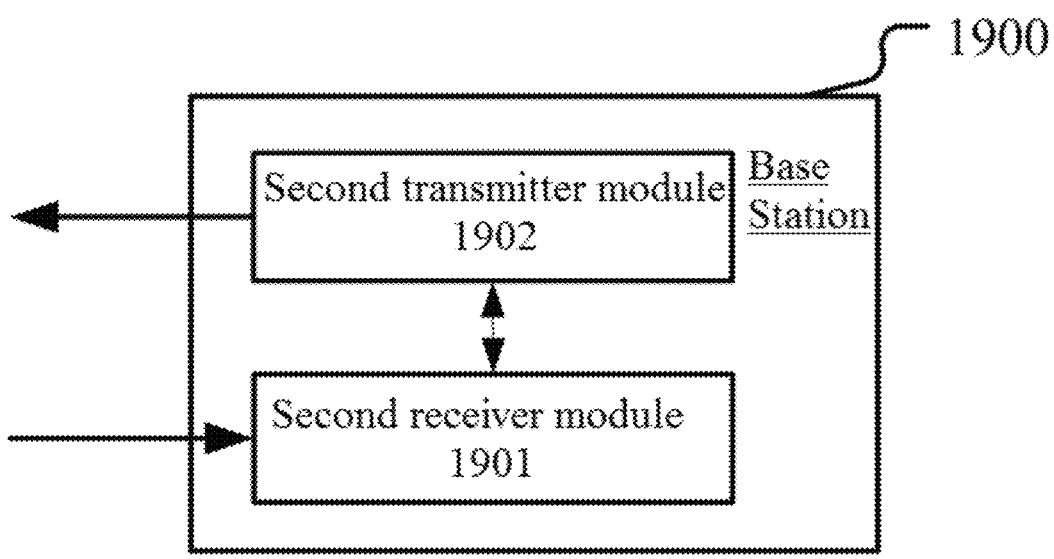
FIG. 19 is a structure block diagram illustrating a processing device in a base station according to one embodiment of the present disclosure.

Embodiment 19 illustrates an example of a structure block diagram of a processing device in a base station, as shown in FIG. 19. In FIG. 19, the processing device 1900 in the base station is mainly composed of a second receiver module 1901 and a second transmitter module 1902.

In Embodiment 19, the second receiver module 1901 receives a first radio signal, and the second transmitter module 1902 transmits first information.

In Embodiment 19, the first radio signal includes M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; and at least one of the following is used for determining the target antenna port group from the M antenna port groups:

a first antenna port group, wherein a reception for a radio signal transmitted by the first antenna port group is used for generating the uplink control information carried by the second-type radio signal;

M time-frequency resources, wherein the M first-type radio signals are scheduled by M downlink signalings respectively, and the M downlink signalings are searched for in the M time-frequency resources respectively; and, first information, wherein the first information indicates explicitly the target antenna port group from the M antenna port groups.

Herein, one antenna port group includes a positive integer number of antenna ports, and the M is a positive integer greater than 1.

In one embodiment, the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M; the M1 first-type radio signals correspond to M1 MCS indexes respectively, and a MCS index corresponding to one of the M first-type radio signals is equal to a maximum value in the M1 MCS indexes.

In one embodiment, the second transmitter module 1902 further transmits a first signaling, wherein the first signaling includes scheduling information of the first radio signal.

In one embodiment, the second transmitter module 1902 further transmits the M downlink signalings on the M time-frequency resources respectively, wherein the M downlink signalings include scheduling information of the M first-type radio signals respectively.

In one subembodiment, the second transmitter module 1902 further transmits M4 downlink signalings on M4 time-frequency resources respectively, wherein the M4 downlink signalings include scheduling information of M4 first-type radio signals respectively, the M4 first-type radio signals consist of first-type radio signals in the M1 first-type radio signals that do not belong to the M first-type radio signals, and the M4 is equal to the M1 minus the M.

In one embodiment, a target time-frequency resource belongs to a first time-frequency resource set, the target time-frequency resource is one of the M time-frequency resources that is corresponding to a target radio signal, and the target radio signal is one of the M first-type radio signals that is transmitted by the target antenna port group.

In one subembodiment, the second transmitter module 1902 further transmits a first downlink signaling, wherein the first downlink signaling is used for determining the first time-frequency resource set.

In one embodiment, {the first antenna port group, the target antenna port group} are QCLed with {a second antenna port group, a third antenna port group} respectively, the second antenna port group and the third antenna port group belong to a first antenna port group pair, and the first antenna port group pair includes two antenna port groups.

In one subembodiment, the second transmitter module 1902 further transmits a first reference signal, wherein the first reference signal is transmitted by the second antenna port group, and a measurement targeting the first reference signal is used for determining the third antenna port group.

In one subembodiment, the second receiver module 1901 further receives a second reference signal, wherein the second reference signal is transmitted by the third antenna port group, and a measurement targeting the second reference signal is used for determining the second antenna port group.

In one embodiment, {a number of REs occupied by a first radio sub-signal in time-frequency domain, a number of bits contained in a first bit block, a number of bits contained in a second bit block} are used for determining a number of REs occupied by the second-type radio signal in time-frequency domain; the first radio sub-signal includes a target radio signal and the second-type radio signal, the target radio signal is one of the M first-type radio signals that is transmitted by the target antenna port group, the target radio signal carries the first bit block, and the second-type radio signal carries the second bit block.

In one embodiment, {a number of REs occupied by a second radio signal in time-frequency domain, a number of bits contained in a first bit block, a number of bits contained in a second bit block} are used for determining a number of REs occupied by the second-type radio signal in time-frequency domain; both the second radio signal and a target radio signal carry the first bit block, the second-type radio signal carries the second bit block, and the target radio signal is one of the M first-type radio signals that is transmitted by the target antenna port group; and the second radio signal is a first transmission of the first bit block, and the target radio signal is a retransmission of the first bit block.

In one subembodiment, the second receiver module 1901 further receives the second radio signal.

In one subembodiment, the second transmitter module 1902 further transmits a second signaling, wherein the second signaling includes scheduling information of the second radio signal.

In one embodiment, the second receiver module 1901 includes at least one of {the antenna 420, the receiver 418, the receiving processor 470, the multi-antenna receiving processor 472, the controller/processor 475, the memory 476} mentioned in Embodiment 4.

In one embodiment, the second transmitter module 1902 includes at least one of {the antenna 420, the transmitter 418, the transmitting processor 416, the multi-antenna transmitting processor 471, the controller/processor 475, the memory 476} mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the present disclosure includes but not limited to macro-cellular base stations, micro-cellular base stations, home base stations, relay base station, gNB, TRP, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
receiving M downlink signalings on M time-frequency resources respectively;
transmitting a first radio signal;
wherein the first radio signal comprises M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; the second-type radio signal and a target radio signal are transmitted on one same PUSCH, and the target radio signal is one of the M first-type radio signals that is transmitted by the target antenna port group; and the M time-frequency resources are used for determining the target antenna port group from the M antenna port groups; the M first-type radio signals are scheduled by the M downlink signalings respectively, and the M downlink signalings are searched for in the M time-frequency resources respectively, and the M downlink signalings include scheduling information of the M first-type radio signals respectively; the scheduling information of any of the M first-type radio signals includes at least one of MCS, configuration information of DMRS, HARQ process number, RV or NDI; wherein one antenna port group comprises a positive integer number of antenna ports, and the M is a positive integer greater than 1.

2. The method according to claim 1, comprising:
receiving first information;
wherein the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M;
the M1 first-type radio signals correspond to M1 Modulation and Coding Scheme (MCS) indexes respectively, and a MCS index corresponding to one of the M first-type radio signals is equal to a maximum value in the M1 MCS indexes.

3. The method according to claim 1,
wherein a target time-frequency resource belongs to a first time-frequency resource set, the target time-frequency resource is one of the M time-frequency resources that is corresponding to the target radio signal; one or more antenna ports in a reference antenna port set are used for transmitting radio signals on the first time-frequency resource set, and the reference antenna port set include at least one antenna port; any antenna port in the reference antenna port set is QCLed with one antenna port in a first antenna port group; a reception for a radio signal transmitted by the first antenna port group is used for generating the uplink control information carried by the second-type radio signal; two antenna ports being QCLed refers that: a target receiver for a radio signal transmitted from any of the two antenna ports may receive radio signals transmitted from the two antenna ports using same spatial filtering.

4. The method according to claim 1, wherein
{a first antenna port group, the target antenna port group} are Quasi Co-Located (QCLed) with {a second antenna port group, a third antenna port group} respectively, a reception for a radio signal transmitted by the first antenna port group is used for generating the uplink control information carried by the second-type radio signal, the second antenna port group and the third antenna port group belong to a first antenna port group pair, and the first antenna port group pair comprises two antenna port groups; two antenna ports being QCLed refers that: a target receiver for a radio signal transmitted from any of the two antenna ports may receive radio signals transmitted from the two antenna ports using same spatial filtering.

5. The method according to claim 1, wherein {a number of Resource Elements (REs) occupied by a first radio sub-signal in time-frequency domain, a number of bits contained in a first bit block, a number of bits contained in a second bit block} are used for determining a number of REs occupied by the second-type radio signal in time-frequency domain, the first radio sub-signal comprises the target radio signal and the second-type radio signal, the target radio signal carries the first bit block, and the second-type radio signal carries the second bit block; or, {a number of REs occupied by a second radio signal in time-frequency domain, a number of bits contained in a first bit block, a number of bits contained in a second bit block} are used for determining a number of REs occupied by the second-type radio signal in time-frequency domain, both the second radio signal and the target radio signal carry the first bit block, the second-type radio signal carries the second bit block, the second radio signal is a first transmission of the first bit block, and the target radio signal is a retransmission of the first bit block.

6. A method in a base station for wireless communication, comprising:
transmitting M downlink signalings on M time-frequency resources respectively;
receiving a first radio signal;
wherein the first radio signal comprises M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; the second-type radio signal and a target radio signal are transmitted on one same PUSCH, and the target radio signal is one of the M first-type radio signals that is transmitted by the target antenna port group; and the M time-frequency resources are used for determining the target antenna port group from the M antenna port groups; the M first-type radio signals are scheduled by the M downlink signalings respectively, and the M downlink signalings are searched for in the M time-frequency resources respectively; and the M downlink signalings include scheduling information of the M first-type radio signals respectively; the scheduling information of any of the M first-type radio signals includes at least one of MCS, configuration information of DMRS, HARQ process number, RV or NDI; wherein one antenna port group comprises a positive integer number of antenna ports, and the M is a positive integer greater than 1.

7. The method according to claim 6, comprising:
transmitting first information;
wherein the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M;
the M1 first-type radio signals correspond to M1 MCS indexes respectively, and a MCS index corresponding to one of the M first-type radio signals is equal to a maximum value in the M1 MCS indexes.

8. The method according to claim 6,
wherein a target time-frequency resource belongs to a first time-frequency resource set, the target time-frequency resource is one of the M time-frequency resources that is corresponding to the target radio signal; one or more antenna ports in a reference antenna port set are used for transmitting radio signals on the first time-frequency resource set, and the reference antenna port set include at least one antenna port; any antenna port in the reference antenna port set is QCLed with one antenna port in a first antenna port group; a reception for a radio signal transmitted by the first antenna port group is used for generating the uplink control information carried by the second-type radio signal; two antenna ports being QCLed refers that: a target receiver for a radio signal transmitted from any of the two antenna ports may receive radio signals transmitted from the two antenna ports using same spatial filtering.

9. The method according to claim 6, wherein {a first antenna port group, the target antenna port group} are QCLed with {a second antenna port group, a third antenna port group} respectively, a reception for a radio signal transmitted by the first antenna port group is used for generating the uplink control information carried by the second-type radio signal, the second antenna port group and the third antenna port group belong to a first antenna port group pair, and the first antenna port group pair comprises two antenna port groups; two antenna ports being QCLed refers that: a target receiver for a radio signal transmitted from any of the two antenna ports may receive radio signals transmitted from the two antenna ports using same spatial filtering.

10. The method according to claim 6, wherein {a number of REs occupied by a first radio sub-signal in time-frequency domain, a number of bits contained in a first bit block, a number of bits contained in a second bit block} are used for determining a number of REs occupied by the second-type radio signal in time-frequency domain, the first radio sub-signal comprises the target radio signal and the second-type radio signal, the target radio signal carries the first bit block, and the second-type radio signal carries the second bit block; or, {a number of REs occupied by a second radio signal in time-frequency domain, a number of bits contained in a first bit block, a number of bits contained in a second bit block} are used for determining a number of REs occupied by the second-type radio signal in time-frequency domain, both the second radio signal and the target radio signal carry the first bit block, the second-type radio signal carries the second bit block, the second radio signal is a first transmission of the first bit block, and the target radio signal is a retransmission of the first bit block.

11. A UE for wireless communication, comprising:
a first receiver module, to receive M downlink signalings on M time-frequency resources respectively;
a first transmitter module, to transmit a first radio signal;
wherein the first radio signal comprises M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; the second-type radio signal and a target radio signal are transmitted on one same PUSCH, and the target radio signal is one of the M first-type radio signals that is transmitted by the target antenna port group; and the M time-frequency resources are used for determining the target antenna port group from the M antenna port groups; the M first-type radio signals are scheduled by the M downlink signalings respectively, and the M downlink signalings are searched for in the M time-frequency resources respectively; and the M downlink signalings include scheduling information of the M first-type radio signals respectively; the scheduling information of any of the M first-type radio signals includes at least one of MCS, configuration information of DMRS, HARQ process number, RV or NDI; wherein one antenna port group comprises a positive integer number of antenna ports, and the M is a positive integer greater than 1.

12. The UE according to claim 11, wherein
the first receiver module receives first information;
wherein the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M;
the M1 first-type radio signals correspond to M1 MCS indexes respectively, and a MCS index corresponding to one of the M first-type radio signals is equal to a maximum value in the M1 MCS indexes.

13. The UE according to claim 11,
wherein a target time-frequency resource belongs to a first time-frequency resource set, the target time-frequency resource is one of the M time-frequency resources that is corresponding to the target radio signal; one or more antenna ports in a reference antenna port set are used for transmitting radio signals on the first time-frequency resource set, and the reference antenna port set include at least one antenna port; any antenna port in the reference antenna port set is QCLed with one antenna port in a first antenna port group; a reception for a radio signal transmitted by the first antenna port group is used for generating the uplink control information carried by the second-type radio signal; two antenna ports being QCLed refers that: a target receiver for a radio signal transmitted from any of the two antenna ports may receive radio signals transmitted from the two antenna ports using same spatial filtering.

14. The UE according to claim 11, wherein {a first antenna port group, the target antenna port group} are QCLed with {a second antenna port group, a third antenna port group} respectively, a reception for a radio signal transmitted by the first antenna port group is used for generating the uplink control information carried by the second-type radio signal, the second antenna port group and the third antenna port group belong to a first antenna port group pair, and the first antenna port group pair comprises two antenna port groups; two antenna ports being QCLed refers that: a target receiver for a radio signal transmitted from any of the two antenna ports may receive radio signals transmitted from the two antenna ports using same spatial filtering.

15. The UE according to claim 11, wherein {a number of REs occupied by a first radio sub-signal in time-frequency domain, a number of bits contained in a first bit block, a number of bits contained in a second bit block} are used for determining a number of REs occupied by the second-type radio signal in time-frequency domain, the first radio sub-signal comprises the target radio signal and the second-type radio signal, the target radio signal carries the first bit block, and the second-type radio signal carries the second bit block; or, {a number of REs occupied by a second radio signal in time-frequency domain, a number of bits contained in a first bit block, a number of bits contained in a second bit block} are used for determining a number of REs occupied by the second-type radio signal in time-frequency domain, both the second radio signal and the target radio signal carry the first bit block, the second-type radio signal carries the second bit block, the second radio signal is a first transmission of the first bit block, and the target radio signal is a retransmission of the first bit block.

16. A base station device for wireless communication, comprising:
a second transmitter module, to transmit M downlink signalings on M time-frequency resources respectively;
a second receiver module, to receive a first radio signal;
wherein the first radio signal comprises M first-type radio signals and a second-type radio signal; the M first-type radio signals are transmitted by M antenna port groups respectively, and the second-type radio signal is transmitted by a target antenna port group; the M first-type radio signals carry data respectively, and the second-type radio signal carries uplink control information; the second-type radio signal and a target radio signal are transmitted on one same PUSCH, and the target radio signal is one of the M first-type radio signals that is transmitted by the target antenna port group; and the M time-frequency resources are used for determining the target antenna port group from the M antenna port groups; the M first-type radio signals are scheduled by the M downlink signalings respectively, and the M downlink signalings are searched for in the M time-frequency resources respectively; and the M downlink signalings include scheduling information of the M first-type radio signals respectively; the scheduling information of any of the M first-type radio signals includes at least one of MCS, configuration information of DMRS, HARQ process number, RV or NDI; wherein one antenna port group comprises a positive integer number of antenna ports, and the M is a positive integer greater than 1.

17. The base station device according to claim 16, wherein
the second transmitter module transmits first information;
wherein the first information is used for determining the target antenna port group from the M antenna port groups, and the M is 2; the first radio signal consists of M1 first-type radio signals and the second-type radio signal, the M1 first-type radio signals are transmitted by M1 antenna port groups respectively, and the M1 is a positive integer greater than or equal to the M;
the M1 first-type radio signals correspond to M1 MCS indexes respectively, and a MCS index corresponding to one of the M first-type radio signals is equal to a maximum value in the M1 MCS indexes.

18. The base station device according to claim 16, wherein
a target time-frequency resource belongs to a first time-frequency resource set, the target time-frequency resource is one of the M time-frequency resources that is corresponding to the target radio signal; one or more antenna ports in a reference antenna port set are used for transmitting radio signals on the first time-frequency resource set, and the reference antenna port set include at least one antenna port; any antenna port in the reference antenna port set is QCLed with one antenna port in a first antenna port group; a reception for a radio signal transmitted by the first antenna port group is used for generating the uplink control information carried by the second-type radio signal; two antenna ports being QCLed refers that: a target receiver for a radio signal transmitted from any of the two antenna ports may receive radio signals transmitted from the two antenna ports using same spatial filtering.

19. The base station device according to claim 16, wherein {a first antenna port group, the target antenna port group} are QCLed with {a second antenna port group, a third antenna port group} respectively, a reception for a radio signal transmitted by the first antenna port group is used for generating the uplink control information carried by the second-type radio signal, the second antenna port group and the third antenna port group belong to a first antenna port group pair, and the first antenna port group pair comprises two antenna port groups; two antenna ports being QCLed refers that: a target receiver for a radio signal transmitted from any of the two antenna ports may receive radio signals transmitted from the two antenna ports using same spatial filtering.

20. The base station device according to claim 16, wherein {a number of REs occupied by a first radio sub-signal in time-frequency domain, a number of bits contained in a first bit block, a number of bits contained in a second bit block} are used for determining a number of REs occupied by the second-type radio signal in time-frequency domain, the first radio sub-signal comprises the target radio signal and the second-type radio signal, the target radio signal carries the first bit block, and the second-type radio signal carries the second bit block; or, {a number of REs occupied by a second radio signal in time-frequency domain, a number of bits contained in a first bit block, a number of bits contained in a second bit block} are used for determining a number of REs occupied by the second-type radio signal in time-frequency domain, both the second radio signal and the target radio signal carry the first bit block, the second-type radio signal carries the second bit block, the second radio signal is a first transmission of the first bit block, and the target radio signal is a retransmission of the first bit block.

* * * * *